US010652207B2

(12) United States Patent
Voss et al.

(10) Patent No.: US 10,652,207 B2
(45) Date of Patent: *May 12, 2020

(54) CLOUD NETWORK AUTOMATION FOR IP ADDRESS AND DNS RECORD MANAGEMENT

(71) Applicant: Infoblox Inc., Santa Clara, CA (US)

(72) Inventors: John Charles Voss, Redwood City, CA (US); Thomas S. Clark, Santa Cruz, CA (US); Sebastien Woirgard, Santa Clara, CA (US); Wei Wang, Vancouver (CA)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,106

(22) Filed: Aug. 31, 2018

(65) Prior Publication Data

US 2019/0097969 A1 Mar. 28, 2019

Related U.S. Application Data

(63) Continuation of application No. 14/852,579, filed on Sep. 13, 2015, now Pat. No. 10,205,701.

(Continued)

(51) Int. Cl.
*H04L 29/12* (2006.01)
*H04L 29/08* (2006.01)
*H04L 29/06* (2006.01)

(52) U.S. Cl.
CPC ...... *H04L 61/3025* (2013.01); *H04L 61/1511* (2013.01); *H04L 61/2015* (2013.01);

(Continued)

(58) Field of Classification Search
CPC ............ H04L 61/1511; H04L 61/2015; H04L 61/3025; H04L 67/02; H04L 67/10; H04L 67/28; H04L 69/22
See application file for complete search history.

(56) References Cited

U.S. PATENT DOCUMENTS 10,205,701 B1* 2/2019 Voss .................... H04L 61/3025
2001/0023447 A1* 9/2001 West ....................... H04L 29/06
709/230

(Continued)

OTHER PUBLICATIONS

Apel et al., Self-Provisioning of Network Infrastructure for Server Landings in Complex Data Center Environments, 2013.

(Continued)

*Primary Examiner* — Gil H. Lee
(74) *Attorney, Agent, or Firm* — Van Pelt, Yi & James LLP

(57) ABSTRACT

Techniques for cloud network automation for IP address and DNS record management are disclosed. In some embodiments, a system, process, and/or computer program product for cloud network automation for IP address and DNS record management includes receiving at a cloud platform appliance (e.g., a virtual or physical IP address and/or DNS management appliance) a cloud request related to a resource (e.g., a virtual or physical resource) in a cloud environment from a global cloud manager; and processing the cloud request at the cloud platform appliance to determine whether to proxy the cloud request to another cloud platform appliance or a grid master or to locally process the cloud request, wherein a storage of infrastructure metadata information for IP address and/or DNS record management is updated based on the cloud request.

19 Claims, 25 Drawing Sheets

Related U.S. Application Data

(60) Provisional application No. 62/092,701, filed on Dec. 16, 2014.

(52) U.S. Cl.
CPC .............. *H04L 67/02* (2013.01); *H04L 67/10* (2013.01); *H04L 67/28* (2013.01); *H04L 69/22* (2013.01)

(56) References Cited

U.S. PATENT DOCUMENTS

| | | | |
|---|---|---|---|
| 2008/0250407 A1* | 10/2008 | Dadhia | G06F 9/45533 718/1 |
| 2012/0173760 A1* | 7/2012 | Jog | H04L 61/1511 709/245 |
| 2013/0326599 A1* | 12/2013 | Bray | H04L 61/1511 726/6 |
| 2014/0143401 A1 | 5/2014 | Carlen | |
| 2014/0214915 A1 | 7/2014 | Dragon | |
| 2014/0297828 A1* | 10/2014 | Voltmer | H04L 41/50 709/223 |
| 2014/0317261 A1 | 10/2014 | Shatzkamer | |
| 2015/0067112 A1 | 3/2015 | Gokhale | |
| 2015/0188788 A1 | 7/2015 | Kolesnik | |
| 2015/0195138 A1* | 7/2015 | Horman | H04L 41/0893 709/226 |

OTHER PUBLICATIONS

Author Unknown, "Agile, Scalable, Reliable Private Cloud," Infoblox Solution Note, Jan. 2015.
Author Unknown, Grid and Multi-Grid Management, Infoblox Datasheet, Jul. 2013.
Author Unknown, Infoblox DDI for Cloud and Virtualization Datasheet, Aug. 2015.
Author Unknown, Infoblox IPAM Plug-in for VMware vCenter Orchestrator and vCloud Automation Center, Jul. 2014.
Author Unknown, Infoblox NIOS Software, Aug. 1, 2010.
Author Unknown, Simplifying Private Cloud Deployments through Network Automation, Infoblox, Jan. 2015.
Jan Ursi, IF-MAP Overview, Infoblox Inc., 2009.
Jim Metzler, The 2012 Cloud Networking Report, Dec. 2012.
Mike Langberg, Infoblox Introduces Scalable Network Control for the Next Generation of Private Cloud Deployments, Jan. 26, 2015.
Ville Törhönen, Designing a Software-Defined Datacenter, Tampere University of Technology, Dec. 4, 2013.

* cited by examiner

FIG. 6

Add Network View Wizard > Step 1 of 3

Name

Comment

┌─ Cloud Setup ─────────────────────────┐
│                                            │
│  Delegation Member   cloudmember1.com      │
│                                            │
│                          [Select] [Clear]  │
└────────────────────────────────────────────┘

[Cancel]                [Next]      [Save & Close]

FIG. 7

| H_eng (Tenant) | |
|---|---|
| | Basic |
| General | |
| Extensible Attributes | Name  H_eng |
| Permissions | ID  8a45648c34a74319a38a3ce6ac742f70 |
| | Comment |

FIG. 11

- ● All Network Views
- ○ Select Network View  [Select]
- ☒ View Cloud Networks Only
  - ● All Tenants
  - ○ Select Tenant  [Select]

Threshold
[75]%

Type
● IPAM Utilization
○ DHCP Utilization

FIG. 19

| Tenant & VMs | Fixed vs. Floating | Available vs. Allocated | |
|---|---|---|---|
| | | | Average Per Tenant |
| 45 | 133 | 54 | |
| | 6000 | 2450 | Total |
| Tenants | Cloud VMs | IP Addresses | |

FIG. 20

CLOUD NETWORK AUTOMATION FOR IP ADDRESS AND DNS RECORD MANAGEMENT

CROSS REFERENCE TO OTHER APPLICATIONS

This application is a continuation of U.S. patent application Ser. No. 14/852,579 entitled CLOUD NETWORK AUTOMATION FOR IP ADDRESS AND DNS RECORD MANAGEMENT, filed Sep. 13, 2015, which claims priority to U.S. Provisional Patent Application No. 62/092,701 entitled CLOUD NETWORK AUTOMATION FOR IP ADDRESS MANAGEMENT, filed Dec. 16, 2014, both of which are incorporated herein by reference for all purposes.

BACKGROUND OF THE INVENTION

The trend towards moving more computing workloads to virtual environments is increasing. The number of virtual machines (VMs) installed at enterprise data centers is also rising as enterprise data centers grow and add more computing workloads.

Virtualization generally allows for a more dynamic computing infrastructure with a higher optimal utilization of physical servers. For example, virtualization allows a single physical machine (e.g., physical server) to host a large number of virtual resources, such as hundreds of virtual resources (e.g., anywhere between less than 20 and more than 200 VMs per server). As a result, there is typically less capital expenditure on computing hardware (e.g., physical servers and/or other computing hardware) when enterprises utilize virtualization for some of their entire computing infrastructure. Virtualization also allows for a pay-as-you-go model for managing compute capacity. In addition, virtualization can also offer flexibility in disaster recovery and dynamic movement of a virtual server from one location to another.

BRIEF DESCRIPTION OF THE DRAWINGS

Various embodiments of the invention are disclosed in the following detailed description and the accompanying drawings.

FIG. 6 is a screen shot of an interface for configuring access controls for users for cloud API requests in accordance with some embodiments.

FIG. 7 is a screen shot of an interface for an editor for a cloud network for cloud network automation in accordance with some embodiments.

FIG. 11 is a screen shot of an interface for editing a tenant in a cloud for cloud network automation in accordance with some embodiments.

FIG. 19 is a screen shot of an interface for a network over thresholds configuration panel for cloud network automation in accordance with some embodiments.

FIG. 20 is a screen shot of an interface for cloud statistics for tenant and virtual machines (VMs) for cloud network automation in accordance with some embodiments.

DETAILED DESCRIPTION

Figure 1:
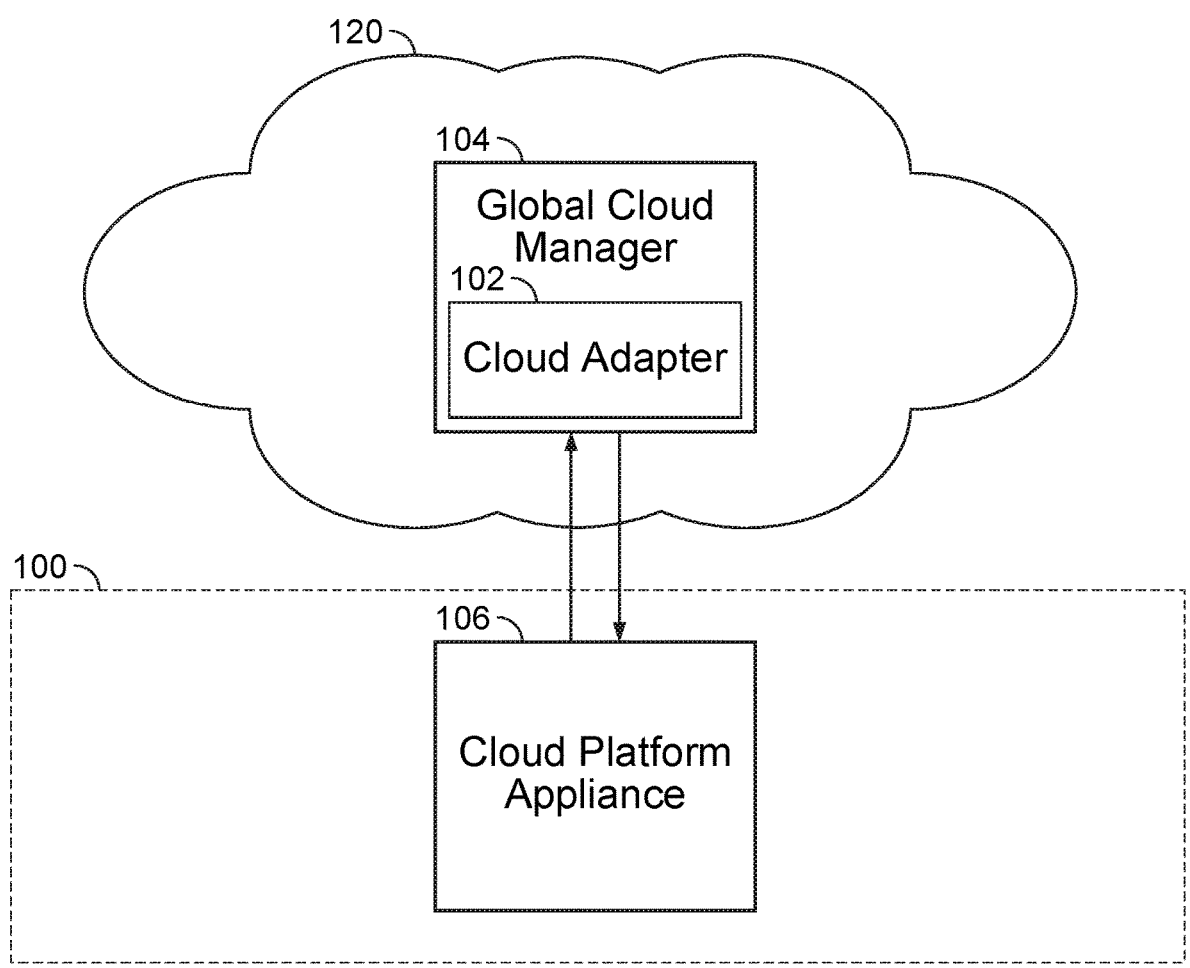
FIG. 1 is a network diagram illustrating a network architecture for providing cloud network automation for IP address and DNS record management in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enterprises are increasingly using virtualization to improve efficiency and to reduce costs of their computing infrastructure. Virtualization generally allows for a more dynamic computing infrastructure with a higher optimal utilization of computing resources (e.g., physical servers, networking devices such as switches and/or routers, and/or other computing resources). In addition, virtualization can also offer greater flexibility, such as in disaster recovery and dynamic movement of a virtual server from one location to another.

For many enterprises, the edge of the data center network for the enterprise can generally be viewed as being at the hypervisor. Virtual switches can be provisioned in hypervisors to switch traffic between VMs and out of the server. Each physical server can have multiple network interface cards (NICs) that attach to different networks, such as management, VMotion (e.g., VMware vSphere VMotion can enable the live migration of running VMs from one physical server to another with zero downtime, continuous service availability, and transaction integrity), backup, Network File System (NFS), Internet Small Computer System Interface (iSCSI), and multiple networks for VMs.

As such, with advances in cloud computing and virtualization, a system administrator (admin) is able to easily add or remove a virtual resource, such as a virtual machine (VM), device or network, as needed, to dynamically match computing and networking needs. Because virtualization allows a single physical machine to host a large number of virtual resources, it is not uncommon for a single organization to utilize hundreds of virtual resources.

For example, an enterprise can use a cloud management platform (CMP) to implement some or all of their enterprise data center using a cloud environment (e.g., generally referred to herein as cloud network environment or cloud network) that includes physical and virtual resources on their CMP (e.g., physical and network devices on their CMP).

The management of these physical and virtual resources for enterprises using such cloud-based computing environments has been traditionally difficult. For example, the "virtual sprawl" of an organization's virtual resources across various users, physical machines, and types of networks (e.g., private or housed/managed by other entities or other boundaries) makes information about virtual resources difficult to obtain and manage across an entire "virtual sprawl." For example, it is difficult for a network administrator to know the exact identity and location of a virtual resource in a virtual cloud environment. Additionally, access restrictions are sometimes placed on virtual environments to isolate and protect the security of users sharing a single physical machine that hosts the virtual resources of various users. This makes obtaining information about virtual resources in a virtual environment even more difficult. Therefore, there exists a need for a better way to obtain and manage information about physical and virtual resources on the CMP.

For example, a VM can be part of multiple networks depending on the access requirements of applications that execute on the VMs. As such, a number of Internet protocol (IP) addresses (IPs) could be assigned per server. As another example, VMs are also added to a Domain Name System (DNS) domain, and DNS names are assigned to VMs. Currently, Information Technology (IT) administrators (e.g., network/server administrators (admins)) typically assign these IPs and DNS names manually.

However, manually assigning IPs and DNS names for physical and virtual network devices on the CMP can be a time consuming and error prone process. Furthermore, manual IP address management generally reduces the flexibility that virtualization offers.

Thus, there is a need for new and improved techniques for assigning IPs and DNS names for physical and virtual network devices in cloud-based computing environments.

Overview of Techniques for Cloud Network Automation for IP Address and DNS Record Management Accordingly, techniques for cloud network automation for IP address and DNS record management are disclosed. The disclosed techniques for DNS, Dynamic Host Configuration Protocol (DHCP), and IP Address Management (IPAM) (e.g., DNS, DHCP, and IPAM are also referred to as DDI) provisioning can more effectively and more efficiently support virtualization and cloud-based computing environments. For example, the disclosed techniques can facilitate automating network provisioning for cloud networks implemented by enterprises (e.g., various implementations of public, private, or hybrid public/private clouds using virtualization, which can include physical and virtual network devices), such as further described below.

In some embodiments, the disclosed techniques for cloud network automation for IP address and DNS record management automate IPAM and DNS record management for physical and virtual network devices on an enterprise's cloud management platform (CMP). For example, instead of manually provisioning IP addresses and DNS name spaces for network devices and interfaces, enterprises can use the disclosed techniques for cloud network automation for IP address management to leverage DNS and DHCP features of a centralized IPAM solution, such as using a grid of IPAM devices/appliances (e.g., a collection of appliances to perform and be managed as an integrated/unified system, which can include a grid master, which is generally an IPAM appliance that maintains a central data store for the grid) to manage their cloud networks.

As an example, if a cloud environment/network for an enterprise includes a large number of servers and VMs that have multiple associated network interfaces, manually provisioning and de-provisioning IP addresses and managing DNS and DHCP data can be error-prone. Utilizing the disclosed techniques for cloud network automation for IP address management can minimize human errors by streamlining IPAM, improve visibility of cloud networks, and maximize the flexibility and efficiency that virtualization offers in a cloud environment.

In an example virtual cloud environment with virtual machines being dynamically created and destroyed, it is desirable to be able to dynamically obtain information about existing virtual machines (VMs) in the virtual cloud environment (e.g., also generally referred to herein as cloud environment or cloud network) to more efficiently manage them. In some embodiments, virtual infrastructure cloud metadata information is collected from the virtual cloud environment. The collected metadata information can be organized and/or outputted (e.g., on a display of a user). For example, the collected metadata information includes identity, location, and attribute information about one or more physical and virtual resources (e.g., a VM, a virtual entity, a virtual device, a virtual network, a virtual switch, a virtual host adaptor, a virtual appliance, or any other element of a virtual cloud) in a virtual cloud environment. In some embodiments, the collected metadata information is organized into hierarchical groupings (e.g., hierarchical folders containing collected metadata information). In some embodiments, the collected metadata information is stored in a storage that includes infrastructure metadata information about both virtual resources and physical resources.

In some embodiments, provisioning an IP address and performing a DNS registration is automatically and programmatically performed for a physical and/or virtual resource (e.g., a virtual machine, a virtual entity, a virtual device, a virtual network, a virtual switch, a virtual host adaptor, a virtual appliance, or any other element of a virtual cloud). In some embodiments, an Internet Protocol address management (IPAM) appliance manages Internet Protocol (IP) addresses of one or more physical and/or virtual resources in a cloud environment in addition to managing IP addresses for physical servers and devices. For example, by communicating with the IPAM appliance, an IP address can be automatically obtained, updated, or released for a physical and/or a virtual resource in a cloud network. In some embodiments, DNS registration is automatically managed for one or more physical and/or virtual resources in a cloud network. For example, a DNS record is automatically updated for a physical and/or virtual resource in the cloud network, as required.

In some embodiments, a system, process, and/or computer program product for cloud network automation for IP address management includes receiving at a cloud platform appliance (e.g., a virtual or physical IP address management appliance that is a member of a grid that includes a plurality of cloud platform appliances and a grid master) a cloud request related to a resource (e.g., a virtual or physical resource) in a cloud environment from a global cloud manager; and processing the cloud request at the cloud platform appliance to determine whether to proxy the cloud request to another cloud platform appliance or a grid master or to locally process the cloud request (e.g., based on which cloud platform appliance (if any) is authoritative for an object associated with the cloud request), in which a storage of infrastructure metadata information for IP address management is updated based on the cloud request. For example, the virtual resource can include one or more of the following: a virtual machine, a virtual entity, a virtual device, a virtual network, a virtual switch, a virtual host adaptor, and a virtual appliance. As an example, the collected infrastructure metadata information can include one or more of the following: a fully qualified domain name (FQDN), an Internet Protocol (IP) address, a Media Access Control (MAC) address, an operating system (OS) metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, and an external network metadata.

As an example, using the disclosed proxying techniques for cloud network automation for IP address management, cloud API requests from a cloud adapter can be distributed (e.g., and need not all be directed to a single device, such as the grid manager). For example, cloud network updates can be sent to local cloud platform appliance(s) and then can be replicated to the grid master. These techniques facilitate an enhanced integration for cloud network automation for IP address management for physical and virtual infrastructures in a cloud environment (e.g., cloud network(s)).

In one embodiment, the disclosed techniques for cloud network automation for IP address and DNS record management are implemented using plug-ins for various cloud platform management (CPM) solutions and for IP address management (IPAM) appliances that integrate the cloud network (e.g., cloud environment) with a centralized and synchronized IPAM system (e.g., the Infoblox Grid™ system, such as further described below) to provide one or more of the following: automated provisioning and reclamation of IP addresses and DNS records for VMs that enables faster VM provisioning and avoids VM sprawl by automatically reclaiming IP addresses when VMs are destroyed; views that enable simple visibility of IP addresses, DNS records, VMs, networks, and tenants by group, VLAN, or network; integration with a centralized and synchronized IPAM system for automated high availability and disaster recovery failover for core IP services, including DNS and DHCP; role-based access control, audit trails, and automated one-touch updates to all IPAM appliance members (e.g., all grid members); and centralized management that enables all cloud, virtual, and physical networks to be viewed and controlled from a single web-based GUI console. For example, the disclosed techniques can improve network deployment time by eliminating manual configuration errors and automating provisioning processes for network clouds (e.g., cloud environments), enhancing visibility for individual VM components in dynamic, virtualized network environments, providing improved tools for configuring, viewing, changing, tracking and reporting for such cloud environments, and tracking and logging, for audit and compliance purposes for IP address and DNS record management for such cloud environments.

The disclosed techniques for cloud network automation for IP address and DNS record management can be applied to various use case scenarios, including the example use case scenarios that will now be described.

Example Use Case Scenarios

Use Case 1: Single Virtualized Data Center

A single virtualized data center can utilize cloud network automation for VMs. For example, IP addresses and DNS records can be automatically updated for VMs that are spun up/down in the virtualized data center using the disclosed techniques for cloud network automation for IP address management.

Use Case 2: Multiple Virtualized Data Centers

Another use case extends the cloud network automation for VMs for multiple virtualized data centers. For example, the networks, IP addresses, and DNS records for VMs in multiple data centers can be centrally managed on a single grid using the disclosed techniques for cloud network automation for IP address management.

Use Case 3: Stretched Logical Data Center

Another use case extends the cloud network automation for logical data centers executing on multiple physical data centers by stretching layer-2 (L2) networks across data centers. For example, the same networks that can be deployed across these physical data centers can be effectively and efficiently managed using a centralized IPAM and/or DNS solution using the disclosed techniques for cloud network automation for IP address and DNS record management.

Use Case 4: Multi-Tenant Data Center

Another use case extends the cloud network automation for multi-tenant data centers. In a multi-tenant data center, each tenant network generally resides in its own virtual locally area network (VLAN). As such, tenants can have overlapping IP addresses. In a multi-tenant data center environment, DNS/DHCP servers are generally required for each tenant, which can be effectively and efficiently managed using a centralized IPAM and/or DNS solution using the disclosed techniques for cloud network automation for IP address and DNS record management.

Use Case 5: Development Operations (DevOps)

Another use case extends the cloud network automation for DevOps. For example, a tenant environment with compute, storage, network, and credentials can be implemented in the data center for each application in the data center. In this example, identical tenant environments can be spun up for development (Dev), quality assurance (QA), and production workloads (e.g., computing workloads). Each of these environments is identical with the same IP address space. Each VM in Dev and its counterparts in QA and production would have the same IP address, but different DNS records corresponding to these IP addresses. As will be further described below, the disclosed techniques for cloud network automation for IP address and DNS record management can be similarly applied to effectively and efficiently manage such DevOps environments.

Use Case 6: High-Velocity VMs

Another use case extends the cloud network automation to high-velocity VMs environments. In a high-velocity VMs environment, multiple VMs are often spun up/down quickly. As such, a high-velocity VMs environment generally benefits from an efficient IPAM and/or DNS solution (e.g., efficient API performance on the IP address management server and OS, such as NIOS executed on the cloud platform server and/or grid master, such as further described below) to effectively and efficiently facilitate cloud network automation. For example, this use case can arise when a customer is deploying a new application and wants to standup a number of virtual servers. For example, an enterprise can spin up thousands to tens of thousands of VMs for their Dev/QA directly from a VM provisioning tool, such as a VMware vRealize Orchestrator or another commercially available VM provisioning tool (e.g., for perhaps a customer proof of concept (POC) or launch of a new application, etc.). Manually updating DNS records and obtaining IP addresses for this number of spun-up VMs would typically require a significant amount of time and would generally be error prone. Managed hosting providers can also experience this use case, such as when they are standing up a new customer environment or fulfilling customer requests for more VMs within a time-bound service level agreement (SLA). As such, the disclosed techniques for cloud network automation for IP address and DNS record management can be similarly applied to effectively and efficiently manage such high-velocity VMs environments, as will be further described below.

Use Case 7: Public/Private Hybrid Cloud

Another use case extends the cloud network automation to a public/private hybrid cloud environment. In this use case scenario, an enterprise network has VMs in both an on-premises private cloud and in a public cloud network environment. The enterprise may desire to centrally manage IPAM/DNS records for all VMs across both their private and public cloud network environments. As such, the enterprise may also desire to maintain consistency in DNS names across both private and public cloud VMs. As such, the disclosed techniques for cloud network automation for IP address and DNS record management can be similarly applied to facilitate a central naming convention/policy (e.g., implemented using a grid manager for all VMs across the public/private hybrid cloud network environment for the enterprise, such as will be further described below).

For example, the disclosed techniques for cloud network automation for IP address and DNS record management can be applied to these and/or various other use case scenarios, as will be apparent to one of ordinary skill in the art in view of the embodiments described below.

As further described below, these and various other features and techniques are disclosed for cloud network automation for IP address and DNS record management.

Example Network Architectures for Cloud Network Automation for IP Address Management FIG. 1 is a network diagram illustrating a network architecture for providing cloud network automation for IP address and DNS record management in accordance with some embodiments. As shown, a cloud platform appliance 106 (e.g., a DNS or IPAM server) for enterprise network 100 is in communication with a cloud adapter 102 executed on a global cloud manager 104 (e.g., a global cloud manager application/interface for a CMP executed on a physical device, such as a server) for cloud network 120 that can include various physical and virtual resources (not shown in FIG. 1) (e.g., a cloud computing environment that can include physical and virtual resources for providing virtualized computing and network resources, software, and/or information via a network, such as the Internet). In one embodiment, cloud platform appliance 106 and cloud adapter 102 can implement the activity described herein for providing cloud network automation for IP address and DNS record management.

For example, the cloud adapter can be implemented as an API client (e.g., a plug-in or another integration with the global cloud manager can be implemented) that is executed on the global cloud manager server, such as further described herein. The global cloud manager can be implemented using commercially available or open source virtualization solutions, such as a global cloud manager application, that allow for spinning up/down and generally managing VMs in a cloud-based virtualized computing environment (e.g., example cloud solution providers that provide commercially available cloud management platforms (CMPs) include Amazon, IBM, Xen, and VMware). Cloud network 120 can be a private cloud (e.g., on-premises private cloud) network environment, a public cloud network environment, or a public/private hybrid cloud network environment. As an example, cloud network 120 can be utilized to implement one or more of the above-described use cases.

In an example implementation, the cloud platform appliance is a commercially available IPAM and/or DNS management appliance/server (e.g., a network metadata appliance/server) from Infoblox Inc. of Santa Clara, Calif. or another vendor. For example, the IPAM/DNS management appliance can execute a cloud adapter service (e.g., an IPAM plug-in or another integration with the IPAM appliance can be implemented) that can communicate with the cloud adapter, such as further described below with respect to FIG. 2.

In one embodiment, the cloud platform appliance is implemented as a virtual IPAM server that can be executed on a physical server/appliance. In one embodiment, the IPAM server executes both an IPAM component (e.g., network metadata component) and a DNS component of an integrated IPAM/DNS server/appliance. In one embodiment, the cloud platform appliance is implemented as a virtual IPAM server and a virtual DNS server and, respectively, that can be executed on a single physical server/appliance and/or on distinct physical servers/appliances.

In one embodiment, cloud adapter 102 can automatically communicate global cloud management (e.g., CMP-related) activities/updates to cloud platform appliance 106 (e.g., cloud networks added or removed; virtual or physical resources added or removed; VM(s) added, removed, or migrated; and/or various other CMP-related activities/updates, such as further described below). In one embodiment, cloud adapter 102 can also receive from cloud platform appliance 106 various IP address and/or DNS record management activities for updating global cloud manager 104 (e.g., IP address and DNS configuration information) to facilitate cloud network automation for IP address and DNS record management (e.g., DDI automation), such as further described herein.

In one embodiment, the cloud platform appliance is implemented as an IPAM appliance that is connected to cloud environment 120 via a network. An example of the IPAM appliance includes an IPAM/DNS management appliance offered by Infoblox, Inc. of Santa Clara, Calif. In this example, the IPAM/DNS management appliance interfaces with cloud 120 to manage one or more physical or virtual resources of cloud 120. For example, the IPAM/DNS management appliance can manage the IP addresses and DNS registrations of one or more resources included in cloud 120. In another example, the IPAM/DNS management appliance stores and manages infrastructure metadata information about one or more resources included in cloud 120. For instance, the IPAM/DNS management appliance can store configuration, identification, networking, and/or statistical information about a virtual machine included in cloud 120.

In one embodiment, cloud platform appliance 106 is a virtual appliance implemented on one or more virtual machines and/or one or more servers included in cloud 120 or a different cloud environment. In one embodiment, cloud platform appliance 106 is a physical server appliance connected to cloud 120 via a network. Examples of the networks discussed in this specification may include one or more of the following: a direct or indirect physical communication connection, mobile communication network, Internet, intranet, Local Area Network (LAN), Wide Area Network (WAN), Storage Area Network (SAN), and any other form of connecting two or more systems or storage devices together.

In one embodiment, cloud platform appliance 106 is a member of a grid that includes a plurality of cloud platform appliances and a grid master (e.g., the grid master can maintain a centralized data store of IPAM, DNS, and DHCP related data), such as further described below with respect to FIG. 2. In one embodiment, cloud platform appliance 106 receives cloud API requests and can act as a proxy for other authoritative cloud platform members and for the grid master, such as further described below with respect to FIG. 2.

As would be apparent to one of ordinary skill in the art, enterprise network 100 and cloud network 120 can include various other network devices, including virtual and/or physical servers/appliances as well as physical, virtual, and/or software-defined networking (SDN) devices, and/or client devices. For example, network devices can include various routers, switches, firewalls/security devices, load balancers, and/or other network devices that can implement network control based on a DNS or network metadata policy.

Figure 2:
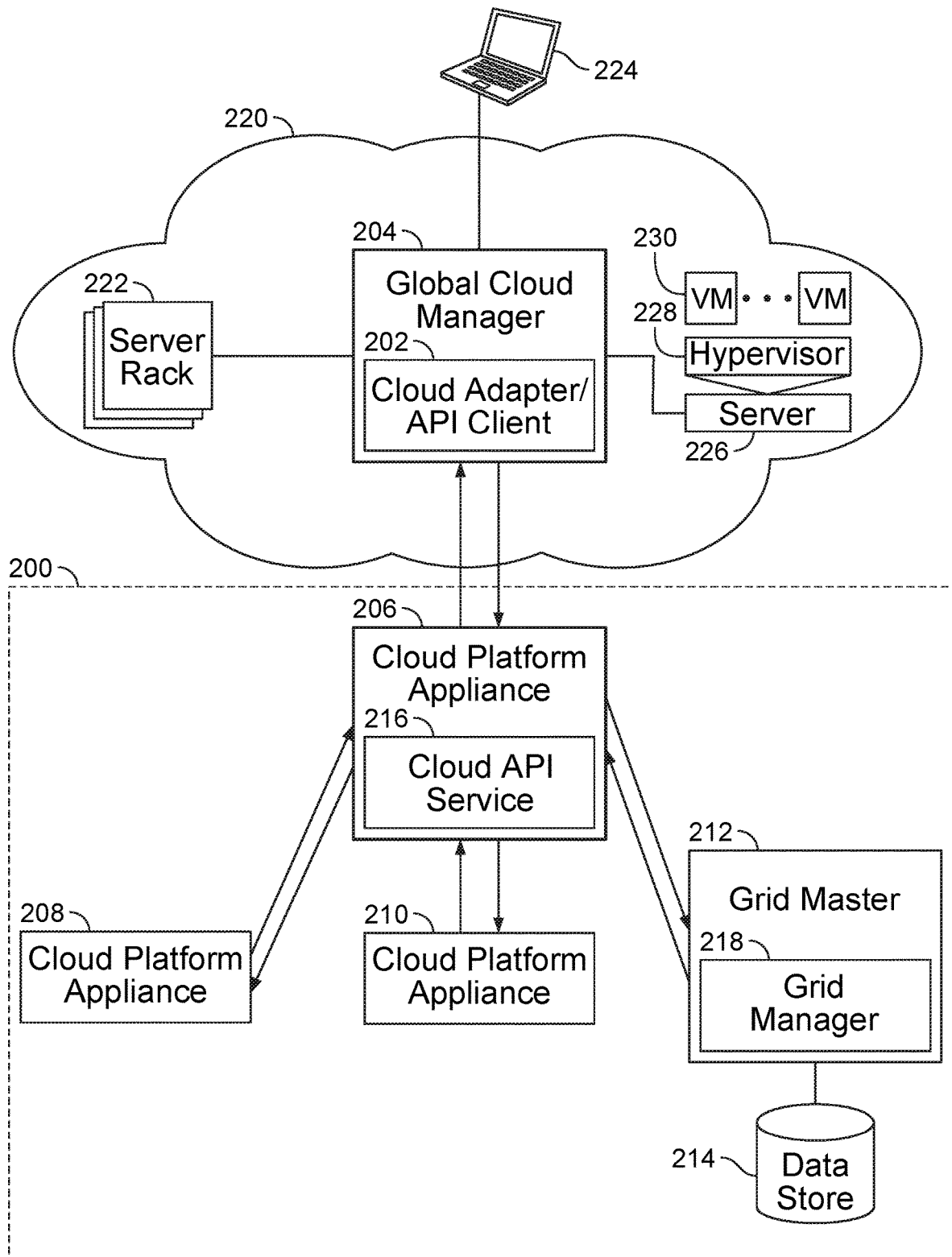
FIG. 2 is a network diagram illustrating another network architecture for providing cloud network automation for IP address and DNS record management in accordance with some embodiments.

FIG. 2 is a network diagram illustrating another network architecture for providing cloud network automation for IP address and DNS record management in accordance with some embodiments. As described below, FIG. 2 provides an overview of various operations for cloud network automation for IP address and DNS record management in accordance with some embodiments.

Referring to FIG. 2, a grid member can be selected as the cloud platform appliance to deploy cloud network automation for IP address and DNS record management, as shown by cloud platform appliance 206 of FIG. 2 (e.g., by configuring the cloud platform appliance and installing a cloud API service and cloud platform license). In one embodiment, cloud platform appliance 206 is a grid member designed and dedicated to accept and process requests related to cloud objects (e.g., via WAPI (RESTful API) communications with cloud adapter/API client 202 of global cloud manager 204).

In one embodiment, multiple cloud platform appliances can be deployed as shown by cloud platform appliances 206, 208, and 210 of FIG. 2. In this example, the grid includes cloud platform appliances 206, 208, and 210 as well as a grid master 212 that executes a grid manager 218 such as further described below. As also shown, grid master 212 is in communication with a data store 214. In this example, grid master 212 maintains a master set of data for the grid (e.g., reconciled IP address management, DNS, and DHCP related data for the grid) in data store 214.

In one embodiment, one of the deployed cloud platform appliances is configured as a primary cloud platform appliance. In this example, cloud platform appliance 206 is configured as the primary cloud platform appliance. As also shown in FIG. 2, the primary cloud platform appliance (e.g., shown as cloud platform appliance 206) can be used as a proxy to communicate with the other cloud platform appliances, cloud platform appliances 208 and 210 in this example, as well as with grid master 212. For example, cloud platform appliance 206 can communicate with the other cloud platform appliances 208 and 210 and grid master 212 of enterprise network 200 via secure communications, (e.g., using HTTPS protocol communications or other secure network protocol communications).

In one embodiment, the disclosed techniques for cloud network automation for IP address and DNS record management automate IP address management (IPAM) and DNS record management for physical and virtual network resources on an enterprise's cloud network(s)/environment(s) by integrating a centralized IPAM and/or DNS solution/platform with a cloud management platform (CMP). For example, instead of manually provisioning IP addresses and DNS name spaces for network devices and interfaces, a network admin for the enterprise can use the disclosed techniques for cloud network automation for IP address management to leverage DNS and DHCP features of a centralized IPAM solution/platform (e.g., the Infoblox Grid™) to manage any such cloud networks for the enterprise.

As similarly discussed above, when a cloud network includes a large number of servers and VMs (e.g., hundreds, thousands, or more virtual servers and/or VMs) that have multiple associated network interfaces, manually provisioning and de-provisioning IP addresses and managing DNS and DHCP data can be time consuming and error prone. For example, utilizing the disclosed techniques for cloud network automation for IP address and DNS record management can minimize human errors by streamlining IPAM and DNS record management, improve visibility of cloud networks (e.g., enterprise cloud networks), and maximize the flexibility and efficiency that virtualization offers in a cloud environment.

Referring to FIG. 2, a cloud adapter is provided shown as a cloud adapter/API client 202 (e.g., also referred to herein as the cloud adapter) that is integrated with and executed on global cloud manager server 204 (e.g., a plug-in or another integration with the global cloud manager can be implemented). In an example implementation, cloud adapter/API client 202 can be provided by the Infoblox VMware Cloud Adapter (e.g., additional plug-ins can similarly be provided for other commercially available CMP solutions such as Microsoft System Center Orchestrator or OpenStack, in which such a plug-in can be implemented in software, such as using the C and/or Java programming language or another programming language, and executed on the global cloud manager server). In this example implementation, cloud adapter/API client 202 can be used as the cloud API client for sending cloud API requests to the cloud platform appliance(s) (e.g., via secure communications, such as using HTTPS protocol communications or other secure network protocol communications, over a network, which can include the Internet), such as further described below.

As also shown in FIG. 2, the CMP for a cloud environment, shown as global cloud manager 204, is in communication with one or more physical servers in a cloud network 220 (e.g., an example cloud environment), such as a server rack 222 and a server 226. Each of these physical servers can execute a hypervisor (e.g., a virtual machine (VM) manager), such as hypervisor 228 executed on server 226 as shown. The hypervisor can allow the server to host multiple virtual resources, such as multiple virtual machines (VMs) 230 as shown (e.g., the hypervisor can allow the server(s) to host various other virtual resources, including virtual networking devices such as virtual switches, as similarly described above). The hypervisor also provides a virtual operating platform that allows different operating system instances and types to execute on the physical server hardware (e.g., to execute on one or more hardware processors of the physical server hardware). In some cases, each VM can be executing a separate instance of an operating system (OS) with individual configurations. Examples of hypervisors include VMware ESX/ESXi™ server and VMware vSphere™ offered by VMware, Inc. of Palo Alto, Calif. Other physical and/or virtual resources may also be a part of cloud environment 220, including other virtual switches, virtual host adaptors, virtual appliances, and any other virtual or physical network components, appliances, and devices. The items shown inside cloud environment 220 are merely examples of any number of same or different types of components that may comprise cloud environment 220.

In an example implementation, global cloud manager 204 includes or is in communication with an infrastructure manager(s) (not shown in FIG. 2). An example of an infrastructure manager is vCenter™ Server offered by VMware, Inc. An infrastructure manager can manage virtualized hardware resources (e.g., memory, processors, etc.) of physical servers (e.g., physical servers 222 and 226) that can be shared and allocated to any of the virtual resources hosted by the servers. In this example, the infrastructure manager includes and/or is in communication with global cloud manager 204 that manages the physical and virtual resources (e.g., including applications and/or services) provided by cloud environment 220. Global cloud manager 204 also may manage multiple hypervisors and/or groups of hypervisors. An example of global cloud manager 204 includes vCloud™ Director or vRealize™ Automation Center offered by VMware, Inc.

As also shown in FIG. 2, a user (e.g., a cloud/network admin) can configure the cloud network to add or remove a cloud network, add or remove VMs, and/or perform other actions on the cloud network via a client device 224 (e.g., laptop, tablet, smart phone, or other client computing device) in network communication (e.g., via secure communications, such as using HTTPS protocol communications or other secure network protocol communications, over a network, which can include the Internet) with global cloud manager 204 as also shown in FIG. 2.

In one embodiment, global cloud manager 204 is used to manage cloud environment 220. For example, a user (e.g., a cloud/network admin) can use global cloud manager 204 to customize the cloud environment and physical and virtual resources of cloud environment 220. In an example implementation, the cloud API service executed on cloud platform appliance 206 communicates with the cloud adapter executed on global cloud manager 204 through a web service or application programming interface (API), such as further described below. In an example implementation, the cloud API service allows services of the IPAM/DNS management appliance (e.g., management of IP addresses and DNS registration for virtual resources) to be utilized by global cloud manager 204.

In one embodiment, cloud adapter 202 is implemented as an IPAM/DNS management agent that is connected/integrated with and/or included in global cloud manager 204 and listens to messages (e.g., API requests) communicated to and from global cloud manager 204 to detect information to be passed to cloud platform appliance 206. This allows cloud platform appliance 206 to interface with global cloud manager 204.

In an example implementation, a stand-alone interface application interfaces between global cloud manager 204 and cloud platform appliance 206. For example, a global cloud manager interface application (not shown in FIG. 2) can be provided that interfaces with cloud platform appliance 206 (e.g., via an IPAM/DNS management plug-in, such as cloud API service 216). In this example, the global cloud manager interface application also interfaces with global cloud manager 204 (e.g., via an IPAM/DNS management agent, such as cloud adapter 202), such as through a standard protocol such as Advanced Message Queuing Protocol (AMQP).

In one embodiment, cloud adapter/API client 202 is configured to send API requests to a single cloud platform appliance (e.g., primary cloud platform appliance), such as cloud platform appliance 206 as shown in FIG. 2. In one embodiment, cloud platform appliance 206 receives cloud API requests and can act as a proxy for other authoritative cloud platform members and for the grid master, such as further described below.

In one embodiment, cloud adapter/API client 202 is configured to send API requests to different cloud platform appliances. For example, configuring the cloud adapter/API client 202 to send API requests to different cloud platform appliances can facilitate handling situations where the primary cloud platform appliance may not be available or to distribute the API load among multiple cloud platform appliances (e.g., for workload balancing among the multiple cloud platform appliances).

Referring to FIG. 2, cloud API requests from cloud adapter 202 are processed through a cloud API service 216 that operates on cloud platform appliance 206 (e.g., the cloud API server can be implemented in software, such as using the C and/or Java programming language or another programming language, and executed on the cloud platform appliance). For example, the cloud API service can also be deployed/installed and executed on the grid master, such as grid master 212, as well as other cloud platform appliances for proxying purposes, such as cloud platform appliances 208 and 210. In an example implementation, cloud API service 216 communicates using a secure protocol, such as using HTTPS-based communications (e.g., the cloud API service can communicate via port 443 for HTTPS connectivity, in which this service can use a virtual IP (VIP) address as the destination address).

In one embodiment, depending on authority delegation for objects referenced in the cloud API requests, the primary cloud platform appliance processes requests received from the cloud adapter, or the primary cloud platform appliance can proxy the requests to the grid master or another cloud platform appliance that is authoritative for the requested objects. In this embodiment, each of such other cloud platform appliance(s) and the grid master also execute a cloud API service to support such communications with the cloud API service executed on the primary cloud platform appliance. For example, if a cloud/network admin adds a new VM or removes a VM on a cloud network that is associated with a portion of the IP address space management by cloud platform appliance 208, then primary cloud platform appliance 206 can proxy the request(s) that are related to such cloud network activities/updates and that are received from cloud adapter 202 executed on global cloud manager 204 to cloud platform appliance 208 as that cloud platform appliance is authoritative for the requested objects in this example. Similarly, such request(s) can also be proxied to grid master 212, which can update data store 214, such as further described below.

As an example, using the disclosed proxying techniques for cloud network automation for IP address and DNS record management, cloud API requests from a cloud adapter can be distributed (e.g., and need not all be directed to a single device, such as the grid manager). For example, cloud network updates can be sent to local cloud platform appliance(s) and then can be replicated to the grid master. These techniques facilitate an enhanced integration for cloud network automation for IP address and DNS record management for physical and virtual infrastructures in a cloud environment (e.g., cloud network(s)).

In one embodiment, objects created, modified, or deleted by the cloud adapter are automatically reflected in data store 214. In an example implementation, data store 214 can be implemented using a commercially available or open source object/relational database, such as using the commercially available Infoblox NIOS™ software, which includes a built-in, bloxSDB™ integrated database technology as a component of the Infoblox NIOS™ software, that supports local high availability (HA) and database synchronization of all objects across a grid to ensure that the database of host names, IP addresses, A/PTR records, zones, DHCP fixed address records, DHCP leases, and/or other IPAM, DNS, and DHCP objects is continually synchronized between active/standby devices and across the grid.

In one embodiment, a user (e.g., network/cloud admin) can view cloud objects and their associated data through a graphical user interface (GUI) provided by a cloud automation interface (e.g., executed on the grid master, such as further described below). In an example implementation, a user (e.g., network/cloud admin) can view cloud objects and their associated data through a cloud tab of the grid manager (e.g., in some cases, such would include having a cloud network automation license installed on the grid master; and, in some cases, without the cloud network automation license, VM and tenant information are only displayed as extensible attributes associated with IPAM, DHCP, and DNS objects in the grid manager rather than in separate tables under the cloud tab), such as further described below.

In one embodiment, a tenant object is provided for cloud network automation. For example, a tenant object represents an administrative concept in cloud management platforms (CMP) that associates all the network elements (e.g., networks, zones, DNS A/PTR/CNAME records, VMs, IPs, etc.) that are related and constitutive of the tenant. In an example implementation, the tenant objects can support the following properties: name, comment, unique identifier (UUID), and extensible attributes.

In one embodiment, before a user (e.g., cloud/network admin) can send cloud API requests to a cloud platform appliance or the grid master, the user is added to an authorized user group (e.g., a cloud-api-only admin group). In an example implementation, only admin users that are part of the authorized user group (e.g., a cloud-api-only admin group) may be used for sending cloud API requests. In some cases, if the cloud network automation license is installed on the grid master, tenant permissions can also be assigned to admin users to restrict these users to only be able to view objects related to a given tenant or a set of tenants.

Example Components of a Cloud Platform Appliance

Figure 3:
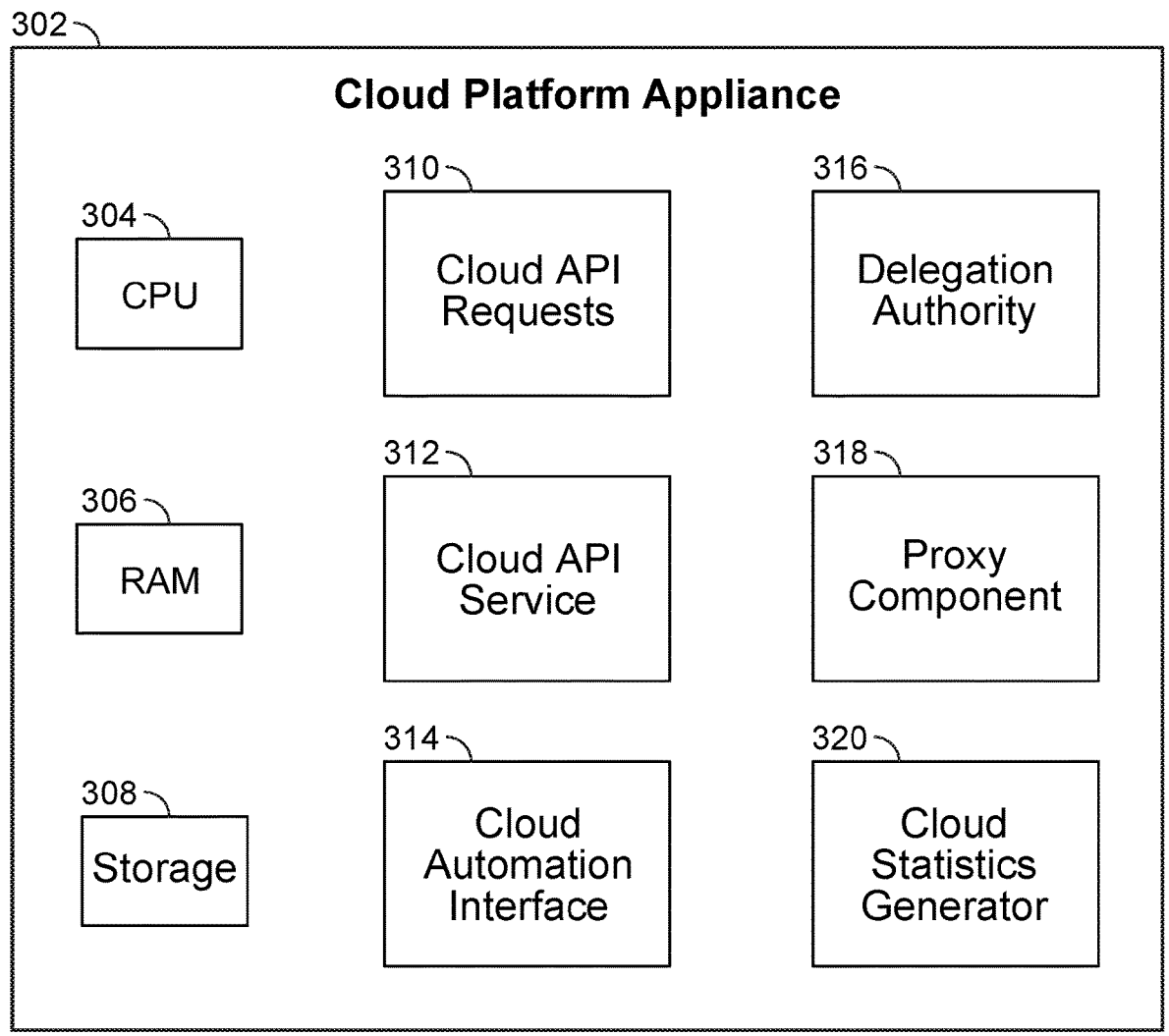
FIG. 3 is a component diagram illustrating a cloud platform appliance in accordance with some embodiments.

FIG. 3 is a component diagram illustrating a cloud platform appliance in accordance with some embodiments. As shown, a cloud platform appliance 302 includes a CPU 304, a RAM 306, and a data storage 308.

As also shown, cloud platform appliance 302 includes cloud API requests 310 (e.g., received from a cloud adapter, such as cloud adapter 202 as shown in FIG. 2), a cloud API service 312 (e.g., the cloud API service can authenticate and process cloud API requests, such as similarly described above with respect to cloud API service 216 as shown in FIG. 2), a cloud automation interface 314 (e.g., the cloud automation interface can include a GUI, such as further described below), a delegation authority 316 (e.g., a delegation authority for one or more cloud objects, such as further described below), a proxy component 318 (e.g., for proxying one or more cloud API requests to a grid master or another cloud platform appliance depending on delegation authority), and a cloud statistics generator 320, which are each further described below. In an example implementation, one or more of components 312, 314, 316, and 318 can be implemented as a software component stored in RAM 306 and/or storage 308 and executed on CPU 304. In some implementations, one or more of these functions can be performed by another device or function, such as the cloud statistics generator can be implemented as a component of the grid manager application executed on the grid manager and/or the proxy component can be performed (e.g., in-whole or in-part) using another device or function (e.g., the proxy component can be a sub-component of cloud API service 312, such as similarly described above with respect to FIG. 2).

In an example implementation, a hardware configuration of a cloud platform appliance can include multiple CPU cores (e.g., two to four or more CPU cores with a virtual CPU core frequency of 2000 MHz, 6000 MHz, 12000 MHz, or greater), a memory (e.g., a memory size of 2 GB, 8 GB, 12 GB, or greater), and a storage (e.g., 160 GB or greater).

In one embodiment, cloud platform appliance 302 implements the activity described above with respect to FIGS. 1 and 2 and as further described below with respect to various embodiments and use case scenarios. For example, cloud API requests 310 can be processed by cloud API service 312 using CPU 304, RAM 306, and storage 308 to facilitate authenticating and processing cloud API requests 310 received by cloud platform appliance 302 relevant to one or more cloud objects delegated to cloud platform appliance 302 and/or proxying any other cloud API requests 310 by proxy component 318 using CPU 304, RAM 306, and storage 308 to send such other cloud API requests 310 to another cloud platform appliance(s) or to a grid master based on delegation authority 316, such as further described below. As also will be further described below, cloud automation interface 314 and/or cloud statistics generator 320 can facilitate dashboard, GUI, and/or other interface access to cloud automation related operations and data.

Cloud API Service

In one embodiment, the cloud API service provides the ability to automate management of IP addresses and DNS records so that a cloud environment can take full advantage of IPAM, DNS, and DHCP capabilities (e.g., as provided in Infoblox NIOS™) without the need for manual intervention. For example, the cloud API service is supported for the following example scenarios.

As a first example scenario, the cloud API service supports communication between the cloud adapter (e.g., acting as an API client) and the cloud platform appliance or between cloud platform appliances, such as similarly described above with respect to FIG. 2. In this case, the cloud API service accepts and processes a subset of the requests (e.g., WAPI requests) that are supported on the grid master either directly from an adapter or proxied through another cloud platform appliance or from the grid master.

As a second example scenario, the cloud API service supports communication between the cloud adapter and the grid master, or between cloud platform appliances and the grid master, such as similarly described above with respect to FIG. 2. In this case, the cloud API service processes requests received directly from the cloud adapter or processes requests received by other cloud platform grid members. In an example implementation, the admin users that can send cloud API requests are authorized cloud API users (e.g., belong to the cloud-api-only admin group) in order for the API requests to be processed by the cloud API service.

Additional example use case scenarios for cloud network automation will now be described.

Example Use Case Scenario: Setting Up Cloud Network Automation

As an example use case scenario for setting up cloud network automation, complete the following operations. Assume that a cloud admin, Alice (e.g., an authorized cloud/network admin), wants to set up cloud network automation for a cloud network for ACME Corporation. On the CMP (e.g., global cloud manager 204 as shown in FIG. 2), Alice installs and configures a cloud adapter (e.g., this adapter functions as the cloud API client as described above) that supports cloud platform appliances (e.g., cloud platform service 216 executed on cloud platform appliance 206 as shown in FIG. 2). Alice then obtains licenses for one or more cloud platform appliances (e.g., such cloud platform appliance licenses can be installed on cloud management platform virtual appliances, in which the cloud platform virtual appliances can be deployed on a hypervisor, and the cloud platform license can be installed along with the grid, DHCP, and DNS licenses included in the license bundle for the cloud platform appliance). If the cloud platform appliance (e.g., cloud platform appliance 206) is not already part of the grid, then Alice joins it to the grid. Alice then logs into the grid manager (e.g., grid manager 218 as shown in FIG. 2) to complete the following operations. Alice starts the cloud API service on the cloud platform appliance (e.g., cloud platform service 216 on cloud platform appliance 206, as in this example, the cloud API service is disabled by default). Alice defines admin users and permissions for the cloud-api-only admin group, and Alice configures which users can send API requests (e.g., global and object permissions for admin users can be configured to determine who can manage specified cloud objects). The cloud network automation set-up is now completed and monitoring of cloud network changes is now automatically performed, such as further described below with respect to the next example use case scenario.

Example Use Case Scenario: Monitoring for Cloud Network Changes

As an example use case scenario for the monitoring of cloud network changes and automatically updating the NIOS data based on a change in the cloud, assume that the cloud admin, Alice, makes a change to the cloud environment for ACME Corporation, such as to create a new network or a new VM using client device 224 in communication with global cloud manager 204. Cloud adapter 202 sends the corresponding cloud API request to cloud platform appliance 206 through cloud API service 216. Cloud API service 216 executed on cloud platform appliance 206 processes the cloud API request. If cloud platform appliance 206 determines that it is not authoritative for the one or more objects referenced in the request (e.g., the new network or new VM that Alice created on the cloud network for ACME Corporation), then it proxies the request to grid master 212 or another cloud platform appliance (e.g., to cloud platform appliance 208 or cloud platform appliance 210 as shown in FIG. 2) depending on the authority delegation, such as further described below.

Monitoring Cloud API Service

As similarly described above, the cloud API service facilitates monitoring for cloud network changes based on requests received from the cloud adapter that are processed by the cloud API service and cloud platform appliance. In one embodiment, a status of the cloud API service is monitored. For example, the grid manager (e.g., grid manager 218 as shown in FIG. 2) can be configured to display the status of the cloud API service.

In an example implementation, to monitor the status of the cloud API service, a user (e.g., cloud/network admin) can view a service status of the cloud API service from the cloud tab of the user interface (e.g., select a members tab to access a cloud member link, and the grid manager displays the service status). In another example implementation, to monitor the status of the cloud API service, a user (e.g., cloud/ network admin) can view a service status of the cloud API service through the member service status of the user interface (e.g., the cloud platform appliance can be configured to receive SNMP traps for the cloud API service, and event messages can be reviewed in the syslog and/or a cloud statistics widget can be provided to display such cloud statistics through a dashboard interface).

Cloud API Requests

In the cloud environment, the cloud adapter (e.g., cloud adapter 202 as shown in FIG. 2) acts as the cloud API client. In an example implementation, only API requests made by an authorized cloud admin (e.g., a user who belongs to the cloud-api-only admin group or on the cloud API Access Control List (ACL)) are processed by the cloud API service (e.g., cloud API service 216 as shown in FIG. 2).

For example, when the cloud platform appliance receives a cloud API request, the cloud platform appliance processes the request based on authority delegation of the objects and respective cloud extensible attributes. If the cloud platform appliance is not authoritative for the referenced objects, the cloud platform appliance proxies the request to the authoritative cloud platform appliance that can be another cloud platform appliance or to the grid master if no authority delegation is (yet) specified. Proxying cloud API requests is also further described below.

Cloud API Request Processing

In one embodiment, cloud API requests are subject to the following processing before responses are returned, including authentication and categorization, authorization, proxying requests, validation, and auditing. Each of such processing of cloud API requests is described further below.

In one embodiment, cloud API requests are subject to authentication and categorization processing. For example, cloud API requests can be authenticated based on the authentication sources. Once authenticated, the requests can be categorized as either a cloud API request or not. Requests that specify user identity as authorized users (e.g., users that belong to the cloud-api-only admin group) can be categorized as cloud API requests.

In one embodiment, cloud API requests are subject to authorization processing. For example, cloud API requests can be subject to authorization based on the Access Control Lists (ACLs) defined for the grid or cloud platform appliance (e.g., to control which admin accounts can be used to send API requests). In some cases, the ACLs can include admin users in the cloud-api-only group or remote authenticated users.

In one embodiment, cloud API requests are subject to proxying requests processing. For example, if a cloud platform appliance is not authoritative for a cloud API request, it proxies the request either to the authoritative cloud platform appliance or to the grid master for processing. Similarly, if an object has been delegated and the API request is made to the grid master, the grid master proxies that request to the authoritative cloud platform appliance.

In one embodiment, cloud API requests are subject to validation processing. For example, the cloud platform appliance (e.g., the software platform, such as Infoblox NIOS™, executed on the cloud platform appliance) performs a final validation on the cloud API request based on permissions configured for the admin users and restrictions for the applicable objects. If the request is processed within the scope of an explicit delegation, the admin user is considered to have full permissions within the scope, and any permission defined for the cloud-api-only admin group is ignored. Otherwise, the request is subject to validation for all permissions defined for the cloud-api-only admin group.

In one embodiment, cloud API requests are subject to auditing processing. For example, cloud API related events can be logged to the syslog (e.g., Infoblox NIOS™ syslog) of the grid member that processes the API requests (e.g., instead of to the Infoblox NIOS™ audit log).

Cloud API Objects

In one embodiment, a variety of different cloud API objects are supported for the cloud API service. Example cloud API objects including types, methods, and functions will be described below. In an example implementation, the types and operations for cloud API requests are subsets of all types and operations supported on the grid master. In this example, extensible attributes can be used to associate specific information with a cloud object. In addition, when delegating authority for supported cloud objects, the requests can be processed differently based on, for example, the following: how the object was first created; and/or whether authority for the object has already been delegated to a cloud platform appliance.

Example cloud API objects for the cloud API service include network view, IPv4/IPv6 network container, IPv4/IPv6 network, IPv4/IPv6 DHCP range, IPv4/IPv6 fixed address, DNS view, DNS zone, host record, DNS resource record (e.g., DNS A, PTR, CNAME, etc.), grid member, grid, and extensible attribute. Each of these example cloud API objects is further described below.

In this example, network view is a supported cloud API object for the cloud API service. The allowed operations for the supported object type of network view include read, create, modify, and delete.

In this example, IPv4 network container is another supported cloud API object for the cloud API service. The allowed operations for the supported object type of IPv4 network container include read, create, modify, and delete (e.g., and this example cloud API object can include a function: next_available_network).

In this example, IPv6 network container is another supported cloud API object for the cloud API service. The allowed operations for the supported object type of IPv6 network container include read, create, modify, and delete (e.g., and this example cloud API object can include a function: next_available_network).

In this example, IPv4 network is another supported cloud API object for the cloud API service. The allowed operations for the supported object type of IPv4 network include read, create, modify, and delete (e.g., and this example cloud API object can include a function: next_available_ip).

In this example, IPv6 network is another supported cloud API object for the cloud API service. The allowed operations for the supported object type of IPv6 network include read, create, modify, and delete (e.g., and this example cloud API object can include a function: next_available_ip).

In this example, IPv4 DHCP range is another supported cloud API object for the cloud API service. The allowed operations for the supported object type of IPv4 DHCP range include read, create, modify, and delete (e.g., and this example cloud API object can include a function: next_available_ip).

In this example, IPv6 DHCP range is another supported cloud API object for the cloud API service. The allowed operations for the supported object type of IPv6 DHCP range include read, create, modify, and delete (e.g., and this example cloud API object can include a function: next_available_ip).

In this example, IPv4 fixed address is another supported cloud API object for the cloud API service. The allowed operations for the supported object type of IPv4 fixed address include read, create, modify, and delete (e.g., and this example cloud API object can include a function: next_available_ip).

In this example, IPv6 fixed address is another supported cloud API object for the cloud API service. The allowed operations for the supported object type of IPv6 fixed address include read, create, modify, and delete (e.g., and this example cloud API object can include a function: next_available_ip).

In this example, DNS view is another supported cloud API object for the cloud API service. The allowed operations for the supported object type of DNS view include read and modify.

In this example, DNS zone is another supported cloud API object for the cloud API service. The allowed operations for the supported object type of DNS zone include read, create, modify, and delete.

In this example, host record is another supported cloud API object for the cloud API service. The allowed operations for the supported object types are as follows: allowed operations for record:host include read, create, modify, and delete; allowed operations for record:host_ipv4addr include read, create, modify, and delete (e.g., and this example cloud API object can include a function: next_available_ip); and allowed operations for record:host_ipv6addr include read, create, modify, and delete (e.g., and this example cloud API object can include a function: next_available_ip).

In this example, DNS resource record is another supported cloud API object for the cloud API service. The allowed operations for the supported object types are as follows: allowed operations for record:a include read, create, modify, and delete (e.g., and this example cloud API object can include a function: next_available_ip); allowed operations for record:aaaa include read, create, modify, and delete (e.g., and this example cloud API object can include a function: next_available_ip); allowed operations for record:cname include read, create, modify, and delete; allowed operations for record:ptr include read, create, modify, and delete (e.g., and this example cloud API object can include a function: next_available_ip); allowed operations for record:ptr include read, create, modify, and delete allowed operations for record:mx include read, create, modify, and delete; allowed operations for record:naptr include read, create, modify, and delete; allowed operations for record:srv include read, create, modify, and delete; and allowed operations for record:txt include read, create, modify, and delete.

In this example, grid member is another supported cloud API object for the cloud API service. The allowed operations for the supported object type of grid member include read only (e.g., and this example cloud API object can include a function: restartservices). In an example implementation, API requests calling for service restarts on a grid member can be processed by the cloud platform appliance only if the member requested is also the cloud platform appliance processing the request.

In this example, grid is another supported cloud API object for the cloud API service. The allowed operations for the supported object type of grid include read only (e.g., and this example cloud API object can include a function: restartservices). In an example implementation, all cloud API requests calling for service restarts are proxied to the grid master.

In this example, extensible attribute is another supported cloud API object for the cloud API service. The allowed operations for the supported object type of grid member include read only. In an example implementation, cloud attributes can be used as source objects to obtain the next available IP address or network (e.g., when doing so, the respective network view for the object may also be required to be included).

Sample Cloud API Requests

This section includes sample cloud API requests for supported objects. These are examples of syntax for such cloud API requests, and other syntax and/or different supported objects for cloud API requests can be provided as would now be apparent to one of ordinary skill in the art.

Adding a Network View:
curl -H "Content-Type: application/json" -k1 -u cloud:infoblox -X POST https://10.0.0.2/wapi/v2.0/networkview -d '{"name": "netview1", "extattrs": {"Tenant ID":{"value": "1011"},"Cloud API Owned":{"value": "True"},"CMP Type":{"value":"vCO/vCAC"}}}'

Adding a Network Within the Delegated Network View in the Above Example:
curl -H "Content-Type: application/json" -k1 -u cloud:infoblox -X POST https://10.0.0.2/wapi/v2.0/network -d '{"network":"20.0.0.0/24","network_view":"netwview1", "extattrs": {"Tenant ID":{"value": "1011"},"Cloud API Owned":{"value":"True"},"CMP Type":{"value":"vCO/vCAC"}}}'

Adding a DHCP Range Within the Network Created in the Above Example:
curl -H "Content-Type: application/json" -k1 -u cloud:infoblox -X POST https://10.0.0.2/wapi/v2.0/range -d '{"end_addr": "20.0.0.40", "member": {"_struct": "dhcpmember1", "ipv4addr": "10.0.0.2", "name": "corp100.com"},"network": "20.0.0.0/24", "network_view": "netview1", "start_addr": "20.0.0.35", "extattrs": {"Tenant ID": {"value": "1011"}, "CMP Type": {"value": "vCO/vCAC"},"Cloud API Owned": {"value":"True"}}}'

Adding an A Record:
curl -H "Content-Type: application/json" -k1 -u cloud:infoblox -X POST https://10.0.0.2/wapi/v2.0/record:a -d '{"name": "corp200.com", "ipv4addr":"20.0.0.2","view": "default.netview1","extattrs": {"Tenant ID":{"value": "1011"}, "CMP Type":{"value":"vCO/vCAC"},"Cloud API Owned": {"value":"True"},"VM ID":{"value":"12"}}}'

Adding a Fixed Address:
curl -H "Content-Type: application/json" -k1 -u cloud:infoblox -X POST https://10.0.0.2/wapi/v2.0/fixedaddress -d '{"ipv4addr": "20.0.0.5", "network view":"netview1","mac":"15:06:32:16:00:00","extattrs": {"Tenant ID":{"value": "1011"},"CMP Type":{"value":"vCO/vCAC"},"VM ID":{"value":"352"},"Cloud API Owned": {"value":"True"}}}'

Adding a Zone:
curl -H "Content-Type: application/json" -k1 -u cloud:infoblox -X POST https://10.0.0.2/wapi/v2.0/zone_auth -d '{"fqdn":"test.com","grid_primary":[{"name": "infoblox.localdomain", "stealth": false},{"name": "corp100.com", "stealth": false}],"view": "default.netview1","extattrs": {"Tenant ID":{"value": "1011"}, "CMP Type":{"value": "vCO/cCAC"},"Cloud API Owned":{"value":"True"}}}'

Adding a Network Container:
curl -H "Content-Type: application/json" -k1 -u cloud:infoblox -X POST https://10.0.0.2/wapi/v2.0/networkcontainer -d '{"network": "200.0.0.0/24","network_view": "netview1","extattrs": {"Tenant ID":{"value": "1011"}, "Cloud API Owned":{"value":"True"},"CMP Type": {"value":"vCO/vCAC"}}}'

Adding a Host Record:
curl -H "Content-Type: application/json" -k1 -u cloud: infoblox -X POST https://10.0.0.2/wapi/v2.0/record:host -d '{"ipv4addrs": [{"configure_for_dhcp": false,"ipv4addr": "20.0.0.1", "mac": "11:11:22:22:33:33"}],"ipv6addrs": [{"configure_for_dhcp": false,"duid": "11:22", "ipv6addr": "13::1"},{"configure_for_dhcp": false,"duid": "21:22", "ipv6addr": "13::2"}],"name": "host.corp100.com", "view": "default.netview1"}'

Adding an MX Record:
curl -H "Content-Type: application/json" -k1 -u cloud: infoblox -X POST https://10.0.0.2/wapi/v2.0/record:mx -d '{"mail_exchanger": "abc.com","name": "def.corp100.com", "preference": 10,"view":"default.netview1","extattrs":{"Tenant ID":{"value": "1011"}, "CMP Type":{"value":"vCO/vCAC"}, "Cloud API Owned": {"value":"False"},"VM ID":{"value":"230"}}}'

As similarly described above, in one embodiment, the disclosed techniques for cloud network automation for IP address management include proxying cloud API requests, such as will now be further described below.

Proxying Cloud API Requests

Figure 4:
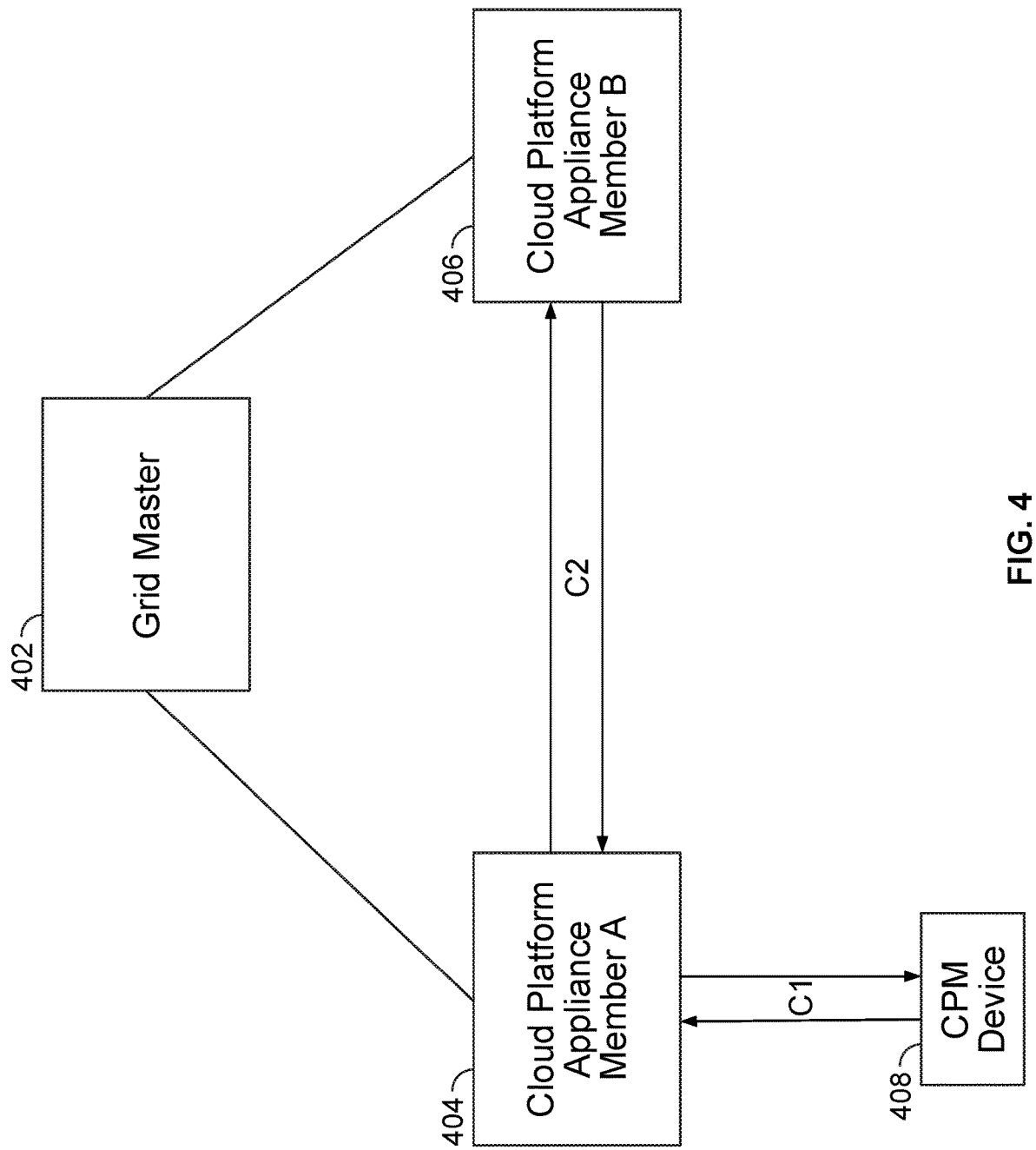
FIG. 4 illustrates proxying cloud API requests from a cloud platform appliance to another cloud platform appliance and/or grid master in accordance with some embodiments.

FIG. 4 illustrates proxying cloud API requests from a cloud platform appliance to another cloud platform appliance and/or grid master in accordance with some embodiments. In one embodiment, FIG. 4 illustrates the proxy mechanism as similarly described above with respect to FIGS. 1-3.

For example, the primary cloud platform appliance that receives cloud API requests can act as a proxy for other authoritative cloud platform members and for the grid master, such as similarly described above with respect to FIG. 2. For example, this proxying mechanism can be used when the cloud platform appliance cannot process requests (e.g., cloud API requests) that contain objects (e.g., cloud objects) for which the cloud platform appliance is not authoritative, or when objects in the requests do not have authority delegation (e.g., to any particular cloud platform appliance in the grid) and as such are processed by the grid master.

FIG. 4 shows an example grid that includes a grid master 402, a cloud platform appliance member A 404, and a cloud platform appliance member B 406. A CPM device 408 is also shown. In one embodiment, CPM device 408 includes a global cloud manager and cloud adapter/API client (e.g., a global cloud manager application and integrated cloud adapter/API client can be executed on the CPM device) as similarly described above with respect to FIG. 2. Cloud API requests may be proxied to another member of the grid (e.g., another cloud platform appliance member or the grid master), depending on the ability of the receiving member to process that request or not (e.g., based on authority delegation for the cloud objects contained in the cloud API request as similarly discussed above).

Referring to FIG. 4, a proxied request (e.g., a proxied cloud API request) is a request that was sent from a CPM device 408 to a cloud platform appliance member A 404 but that was processed by a cloud platform appliance member B 406, transparently for CPM device 408. In this example, the sequence of operation is as follows: (1) CPM device 408 sends a request to cloud platform appliance member A 404 (e.g., via connection C1 as shown, which can be implemented using a secure connection, such as using an HTTPS connection); (2) cloud platform appliance member A 404 receives the request and sends it to cloud platform appliance member B 406 (e.g., via connection C2 as shown, which can be implemented using a secure connection, such as using an HTTPS connection); (3) cloud platform appliance member B 406 processes the request and replies to cloud platform appliance member A 404 (e.g., via connection C2 as shown); and (4) cloud platform appliance member A 404 sends the reply to CPM device 408 (e.g., via connection C1 as shown). As will now be apparent, cloud platform appliance member A 404 can similarly proxy cloud API requests to grid master 402 and/or other cloud platform appliance members of the grid (not shown in FIG. 4).

In an example implementation, a proxied request is sent from CPM device 408 to cloud platform appliance member B 406 as a WAPI request identical to the request sent by CPM device 408. The proxied request is sent from cloud platform appliance member A 404 to cloud platform appliance member B 406 using an HTTPS connection. For security and authentication, a proxied request can include the following HTTP headers to allow, for example, cloud platform appliance member B 406 to authenticate and trust cloud platform appliance member A 404: a proxy authentication (e.g., an NIOS-proxy-authentication); a proxy timestamp (e.g., an NIOS-proxy-timestamp); a proxy source identifier (e.g., an NIOS-proxy-source); and/or a unique identifier (ID) (e.g., an NIOS-proxy-cookie).

In one embodiment, connections (e.g., HTTPS connections or connections using another protocol) between members of the grid may be reused to communicate multiple cloud API requests. Referring to FIG. 4, a client C (e.g., CPM device 408) sends cloud API requests using an HTTPS connection C1. The request is authenticated, authorized by member A (e.g., cloud platform appliance member A 404). In this example, member A determines that this request should be processed by member B (e.g., cloud platform appliance member B 406 has authority delegation for cloud objects contained in the request(s)). As such, member A determines that this request is to be proxied to member B. Member A then forwards the request to member B using an HTTPS connection C2 (e.g., the forwarded request can include the following in an HTTP header: a proxy time stamp (e.g., an NIOS-Proxy-Timestamp), a proxy authentication (e.g., NIOS-Proxy-Authentication generated using a key associated with member A, such as a secret key stored by/associated with member A), and a unique ID (e.g., an NIOS-Proxy-Cookie that includes a value generated by member A)). After member B receives the request, member B verifies the request (e.g., verifies the proxy authentication, processes the request, and sends a reply to member A using connection C2 (e.g., the reply can include the original cookie of the request, contained in the received NIOS-proxy-cookie header as described above and, in some implementations, can also include a proxy hint header such as described below)). Member A sends the reply to client C using connection C1 (e.g., the reply can include the original cookie of the request, contained in the received NIOS-proxy-cookie header as described above and, in some implementations, can also include a proxy hint header such as described below). In this example, authentication and authorization of cloud API requests are performed only on the member receiving the request from the client directly. In this example, a member receiving a request from another member may only authenticate the sending member (e.g., by verifying the proxy authentication, such as provided in an NIOS-proxy-authentication header as described above). In this example, failure in authentication or authorization on the proxying member can cause the cloud API request not to be proxied, and the client can be notified of a failure.

In an example implementation, only successfully authenticated and authorized cloud API requests that require proxying are sent to the respective appliance for processing (e.g., in some cases, proxying can be limited to one hop (or a different number of hops) within the grid). Therefore, if the destination appliance cannot process a proxied request (e.g., proxied cloud API request), the request will not be forwarded and an error is returned to the client. In an example implementation, the proxying mechanism communicates using HTTPS connectivity among the cloud platform appliances as well as to the grid master and/or another (secure) protocol can be used for such communications.

In one embodiment, proxying is limited to one hop (or a different maximum number of hops) within a grid. For example, in such an implementation that is limited to single hops for proxied cloud API requests, a member receiving a proxied query is not allowed to proxy to any other member. As a consequence, if a proxied request processing cannot be completed, the processing will fail and the client will receive an error.

In another embodiment, proxying is not limited to one hop within a grid. For example, one or more or a greater number of hops can be supported for proxied cloud API requests, such as to facilitate support for load balancing and/or failover, to facilitate support for potential configuration changes for delegation authority, and/or for various other purposes (e.g., the authority delegation check may be performed on both members involved in the proxying process and thus depends on the data known by each member at that time; as a result, it is possible that both members have a different view of the data depending on their replication status with the grid master).

In one embodiment, a proxied request is sent to a virtual IP (VIP) address of a destination member as known by the proxying member at the time of the operation. This implies that the member is directly reachable with that address by the proxying member. For example, a cloud API request may be proxied by any member running the cloud API service (e.g., cloud API service 216 as shown in FIG. 2) to any other member also running the cloud API service. As such, requests sent to a member not running the cloud API service (e.g., for any reason) cannot be proxied. These requests would not be answered by the member receiving them. As a result, requests proxied to a member not running the cloud API service (e.g., for any reason) would cause the proxying to fail (e.g., the client can be notified with an error code to indicate that the proxied request failed/did not complete successfully).

Proxy Security

In one embodiment, proxied requests are authenticated by each member or the grid master. For example, various authentication techniques can be performed to authenticate proxied requests, such as using public/private key pairs, signed messages, and/or other authentication techniques can be applied as would be apparent to one of ordinary skill in the art.

Proxy Hints

In one embodiment, responses to a cloud API request include a proxy hint that includes information about the member authoritative for the request and the scope of the authority. For example, the hint can be included in any successful response and, in some cases, in response to a request that failed processing.

In an example implementation, a proxy hint is included in the response as HTTP headers of the following form: NIOS-API-Authority-Scope: <hostname;address;scope;data>. The hostname is the hostname of the member authoritative over the scope. The address is the comma separated list of IP addresses of the member authoritative over the scope (e.g., the address can contain either an IPv4 address, an IPv6 address, or both). The scope defines the type of scope defining the origin of the delegation. The data defines the delegation scope, depending on the type.

As an example, assume that there are two members, such as member A (192.168.2.2, 3ffe::2) and member B (192.168.2.7, 3ffe::7). Assume that member A is authoritative over network container 10.0.0.0/8 in network view "default." In this example, a request to create network 10.0.0.0/24 in network view 0 sent to B is proxied to A and the response to the client contains the following header for API authority scope (e.g., HTTP header NIOS-API-authority-scope): member.domain.com; 192.168.2.2,3ffe::2;address_range; 10.0.0.0/10.0.0.255/default/network_container.

Processing of Proxied Requests

In one embodiment, a determination performed by a grid member (e.g., the (primary) cloud platform appliance executing cloud API service 216 as shown in FIG. 2) of whether to proxy a cloud API request or to process it locally is made by evaluating the following rules (e.g., in this example, in the following order): (1) a cloud API request that is to be processed at the grid master is proxied to the grid master; and (2) a cloud API request received by a member that is not authoritative for the object specified in the request is proxied to the member that is authoritative for that object, if any, or to the grid master in the other case.

In one embodiment, cloud API requests performing search operations are either processed locally on the receiving member or proxied to the grid master at the request of the client (e.g., using a proxy search parameter passed in the request URI, which can include values to specify whether the search can be performed locally on the receiving member (a default value) or whether the search is to be performed by the grid master and, thus, is to be proxied to the grid master). In an example implementation, cloud API requests performing a write operation are not subject to the above-described proxy search parameter and any sub search required by that request can be processed on the same member processing the request. In an example implementation, cloud API requests performing a search that are processed locally on the receiving member are limited to the data available to that member.

As similarly described above, proxied requests can be communicated on different proxy paths as will now be further described below.

Proxy Paths

Figure 5:
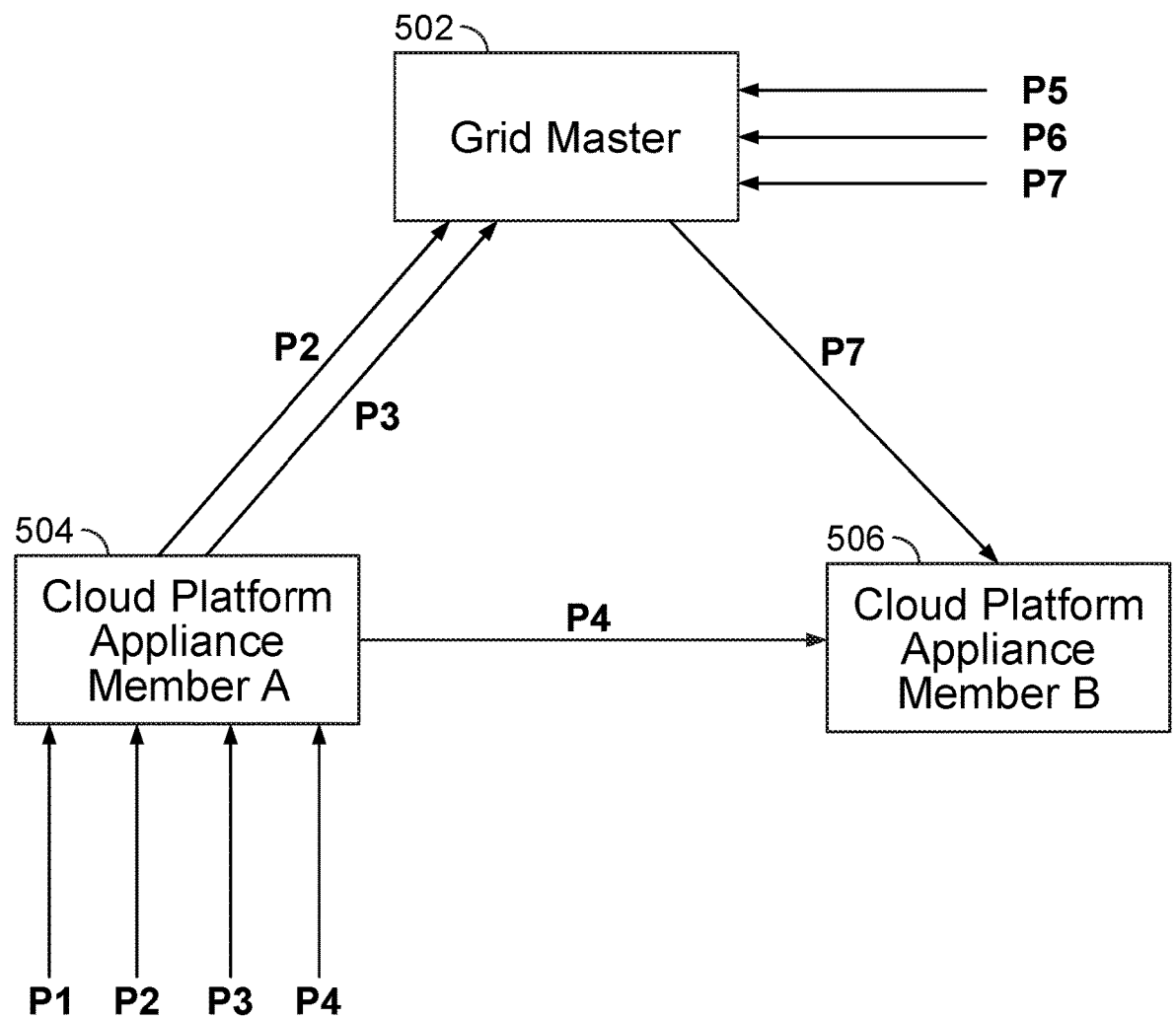
FIG. 5 illustrates proxy paths for cloud API requests in accordance with some embodiments.

FIG. 5 illustrates proxy paths for cloud API requests in accordance with some embodiments. In one embodiment, FIG. 5 illustrates the proxy mechanism as similarly described above with respect to FIGS. 1-4.

As shown in FIG. 5, an example grid includes a grid master 502, a cloud platform appliance member A 504, and a cloud platform appliance member B 506. FIG. 5 illustrates the possible paths that can be followed by a cloud API request in this example grid.

Referring to FIG. 5, P1 is a proxy path for a cloud API request sent to an authoritative member (e.g., cloud platform appliance member A is authoritative for this cloud API request). P2 is a proxy path for a cloud API request sent to an authoritative member, requiring grid master processing. P3 is a proxy path for a cloud API request sent to a non-authoritative member, with no delegation existing for the request object. P4 is a proxy path for a cloud API request sent to a non-authoritative member, with a delegation existing for the request object (e.g., cloud platform appliance member B is authoritative for this cloud API request). P5 is a proxy path for a grid manager (GM) API (e.g., WAPI, PAPI) request on the grid master. P6 is a proxy path for a cloud API request sent to a non-authoritative member, with no delegation existing for the request object. P7 is a proxy path for a cloud API request sent to a non-authoritative member, with a delegation existing for the request object (e.g., the request object has a delegation to cloud platform appliance member B).

As similarly described above, techniques for cloud network automation for IP address management can include authority delegation for cloud objects, such as will now be further described below.

Authority Delegation

In one embodiment, authority delegation in cloud network automation for IP address and DNS record management is the ability to assign control (e.g., full and exclusive control) of IP addresses and DNS name spaces to a particular cloud platform appliance. In an example implementation, a user (e.g., an authorized user, such as admin users who do belong to the cloud-api-only admin group) can perform authority delegation through the grid master. In this example, when a user delegates the authority of IP addresses and DNS name spaces to a particular cloud platform appliance, the grid master loses its authority over the scope of delegation for these IP addresses and DNS name spaces as well as any objects within them. Authority delegation for an object can be explicitly assigned or inherited from parent objects.

In this example implementation, users (e.g., NIOS admin users) who do not belong to the cloud-api-only admin group are not allowed to create new cloud objects, nor can they modify or delete existing cloud objects in delegated spaces; but such users can modify the permissions and certain extensible attribute values for these objects. For example, as similarly described above, only cloud-api-only admin users with the correct global and object permissions can be used to send cloud API requests to create, modify, and delete objects within the delegated scope.

In this example implementation, users can delegate authority to cloud platform appliances, but not to other grid members. Objects that are in queue for scheduled executions or approvals can be locked and cannot be delegated while locked. Authority delegation and reclaiming of authority are subject to approval and can be scheduled.

In this example implementation, users can initiate explicit delegation of authority through a grid manager executed on the grid master. For example, the cloud API service can only be used for implicit or automatic delegation of an object, such as creating a network under a network container that has been delegated, in which the network is implicitly delegated to the member to which the network container is delegated.

For example, the grid master can explicitly delegate authority to the following object types: network view; network container (e.g., IPv4 and IPv6); network (e.g., IPv4 and IPv6); IP Address/DHCP range (e.g., IPv4 and IPv6); and DNS authoritative zone (e.g., zones can be implicitly delegated if the assigned name server is a cloud platform appliance).

In some cases, users can override the inheritance of authority delegation at the object level if the parent object has not been delegated. The grid master can assume authority for objects that do not fall within the scope of delegation.

In this example implementation, users can re-delegate a supported object to another cloud platform appliance by first un-delegating it from a first cloud platform appliance, and then delegating it to a second cloud platform appliance.

In this example implementation, users can reclaim the authority that was delegated to a cloud platform appliance. Once the authority is reclaimed, it goes back to the grid master. Also, any cloud platform appliances that are removed from the grid can automatically lose authority over objects that were delegated to them, and the grid master would become authoritative for these objects.

In this example implementation, a cloud platform appliance can perform discovery on any network containers or networks that are reachable by the appliance. The default discovery settings for the network containers and networks can be inherited from their parent objects.

Delegating Authority for Cloud Objects

In one embodiment, users can delegate authority for cloud objects (e.g., also referred to herein as objects) when creating a new object that has not been delegated or does not inherit authority delegation from one of its parent objects.

Examples for delegating authority for example supported objects are provided below.

Network Views

For example, users can delegate authority for a network view to one cloud platform appliance. If a new network view is created through a cloud API request, then authority can be automatically delegated to the cloud platform appliance that processes the cloud API request to create the new network view. If the network view is created through a cloud API request that is processed on the grid master, then it is shared among all grid members in the grid. The cloud adapter can be configured to balance network views among multiple cloud platform appliances in the grid. To share a network view among different cloud platform members, users can (e.g., manually) provision it and its child objects and delegate them to the respective cloud platform members.

IPv4 and IPv6 Networks and Network Containers

For example, users can delegate authority for a network or network container to one cloud platform appliance and can delegate authority for multiple networks and network containers to the same cloud platform appliance. If a new network or network container is created through a cloud API request, then authority can be automatically delegated to the cloud platform appliance that processes the cloud API request to create the new network or network container. In an example implementation, a new network can be created through a cloud API request using a network template (e.g., the template can be specified in the cloud API request). Delegation for a network or network container (e.g., except for unmanaged networks) can be performed through an explicit delegation operation (e.g., dependent on any existing child or parent delegation(s)) or as a result of inheritance from a parent object.

Reserved or DHCP Ranges

For example, users can delegate authority for a Reserved Range or DHCP range to one cloud platform appliance and can delegate authority for multiple Reserved Ranges or DHCP ranges to the same cloud platform appliance. If a new Reserved Range or DHCP range is created through a cloud API request, then authority can be automatically delegated to the cloud platform appliance that processes the cloud API request to create the new DHCP ranges or to the grid master if the grid master processes the request. In an example implementation, a new Reserved or DHCP range can be created through a cloud API request using a Reserved or DHCP range template (e.g., the template can be specified in the cloud API request). Delegation for Reserved or DHCP ranges can be performed through an explicit delegation operation or as a result of inheritance from a parent object. As an example, users can increase a size of a Reserved or DHCP range that has been explicitly delegated to a cloud platform appliance (e.g., the increased size would be available for use by the cloud platform appliance after replication of the configuration change to the grid).

IPv4 and IPv6 Fixed Addresses

For example, users can delegate authority for a fixed address only through inheritance from one of its parent objects, such as its associated network view, network container, network, or range. As similarly described above, when users create or modify an IPv4 or IPv6 fixed address, the following extensible attributes can be included in the cloud API request: Tenant ID, Cloud API Owned, CMP Type, and VM ID. In an example implementation, a fixed address can be created from the grid master using a fixed address template (e.g., the template can be specified in the cloud API request).

In an example implementation, users cannot create, modify, or delete an IPv4 or IPv6 fixed address on the grid master through the grid manager or standard API requests if the fixed address is within the scope of a network view, network container, network, or range whose authority has been delegated to a cloud platform appliance. If a cloud API request is made to the grid master for a fixed address in a network or range that is delegated to a cloud platform appliance, that request is proxied to the appliance, such as similarly described above with respect to FIG. 5.

DNS Views

In an example implementation, a cloud platform appliance automatically gains authority over any DNS view that exists in the network view whose authority is delegated to that appliance (e.g., users cannot explicitly delegate authority for a DNS view). For example, through a cloud API request, users can update DNS views defined in a network view that has been delegated to the cloud platform appliance. In this example implementation, users cannot create, modify, or delete a DNS view in network views that have been delegated to a cloud platform appliance through a standard API request (e.g., and cannot delete a DNS view as long as it contains at least one DNS zone that has been delegated to a cloud platform appliance).

DNS Zones

For example, a grid primary of a DNS zone automatically gains control for the DNS zone if the primary is a cloud platform appliance. When there are multiple primaries configured for the zone, multiple delegations to these primaries can be allowed if such are cloud platform appliances. All resource records in a DNS zone inherit authority delegation from the zone. Users can modify fields for a zone whose authority has been explicitly delegated.

In this example, the cloud member to which authority for a network view is delegated automatically gains authority for authoritative zones defined in that network view (e.g., the cloud platform appliance is the only cloud member that can be the grid primary for the zones defined in this network view, and the grid master does not have authority for any zone in this network view unless it is assigned as a grid primary). The cloud platform appliance can create, modify, and delete a DNS zone in any DNS view defined in a network view whose authority has been delegated to that cloud member. The cloud platform appliance that is authoritative for a DNS zone can perform changes to the assigned grid primaries, grid secondaries, and external servers assigned to the zone as long as the cloud platform appliance remains a grid primary (e.g., but it cannot create, modify, or delete the DNS record in this example implementation). The cloud platform appliance that is authoritative for a DNS zone can create, modify, and delete DNS delegations that are directly parented to that zone. In particular, it may specify any grid primary, grid secondary, or external server for that zone.

DNS Resource Records

In an example implementation, authority delegation for resource records (e.g., including A, AAAA, CNAME, PTR, MX, SRV, TXT, NAPTR records) is inherited from their parent zones. For example, users can delegate authority for these records by delegating authority for their respective parent zones.

In this example implementation, if the cloud platform appliance is a grid primary for a zone, a request that includes a supported record is processed locally by the cloud platform appliance. Otherwise, the request is proxied to the cloud platform appliance that is assigned as the only grid primary for the zone.

Host Records

In an example implementation, authority delegation for a host record is inherited from both the DNS and IPAM/DHCP portions of the record. For DNS, users can delegate authority for all DNS zones for which the host record is defined. For IPAM/DHCP, users can delegate authority for the parent network view, network container, network, or IPAM/DHCP range defined for the host record.

In this example implementation, the cloud platform appliance can process a cloud API request that includes a host record only if it has gained authority for both DNS and IPAM/DHCP portions of the host record, as follows: all IP addresses enabled for IPAM/DHCP within one or more delegation scopes are delegated to the same cloud platform appliance; and all DNS records defined for one or more DNS zones have the same cloud platform appliance assigned as the grid primary.

Configuring Grid and Member Cloud API Properties

Figure 6:
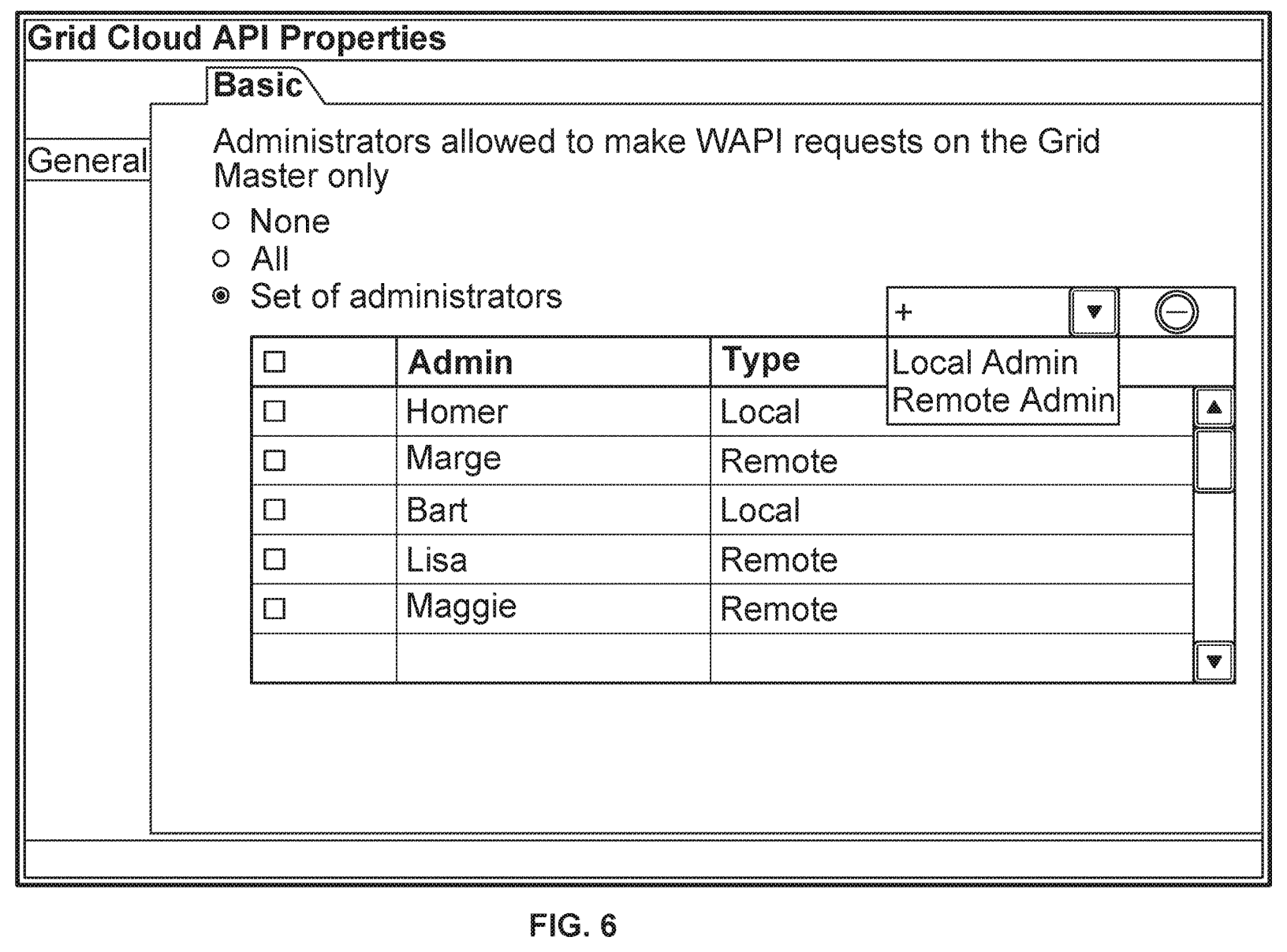

FIG. 6 is a screen shot of an interface for configuring access controls for users for cloud API requests in accordance with some embodiments. In one embodiment, a grid manager (e.g., grid manager 218 as shown in FIG. 2) generates the interface shown in FIG. 6 (e.g., using a cloud automation interface 314 as similarly shown in FIG. 3).

In one embodiment, only authorized users (e.g., admin users in the cloud-api-only admin group) can be used to send cloud API queries by default. To control which admin users, either from this group or from remote servers, can perform cloud API tasks, users can further define ACLs at the grid and member levels using an interface for configuring such ACLs at the grid and member levels, such as shown in FIG. 6 and further described below.

Referring to FIG. 6, from a cloud tab, grid cloud API properties are shown (e.g., after having been selected from a toolbar). In an example implementation, configuration for the grid only applies to the current grid master; it is not inherited by other cloud platform appliances. A configuration interface can be similarly provided for configuring a member (e.g., from the cloud tab, a members tab can be provided to provide for such edit operations). In this example implementation, configuration performed at the member level applies only to the grid member.

As shown in FIG. 6, in the grid cloud API properties editor (e.g., for the current grid master) or the member cloud API properties editor, select the general tab as shown, and then the following can facilitate selection of admins that are allowed to make WAPI requests on the grid master. If none is selected, then none of the admin users in the cloud-api-only admin group can send cloud API requests to the grid master or cloud platform appliance. If all is selected, then all admin users in the cloud-api-only admin group can send cloud API requests to the grid master or cloud platform appliance (e.g., this can be configured as a default setting). As also shown, a specific subset of the admins can be selected to create a list of admin users, both local admin/users and remote admin/users, who can send cloud API requests (e.g., local admin can refer to users defined in the cloud-api-only admin group, and remote admin can refer to users who log in from other remote servers). Also, additional local/remote admin can be added and/or removed from the set of administrators. These users can be authenticated before they can access the grid master or cloud platform appliance.

FIG. 7 is a screen shot of an interface for an editor for a cloud network for cloud network automation in accordance with some embodiments. In one embodiment, a grid manager (e.g., grid manager 218 as shown in FIG. 2) generates the interface shown in FIG. 7 (e.g., using a cloud automation interface 314 as similarly shown in FIG. 3). For example, a wizard can be provided to facilitate users adding a cloud network for cloud network automation and configuring the delegation member as shown in FIG. 7.

Figure 8:
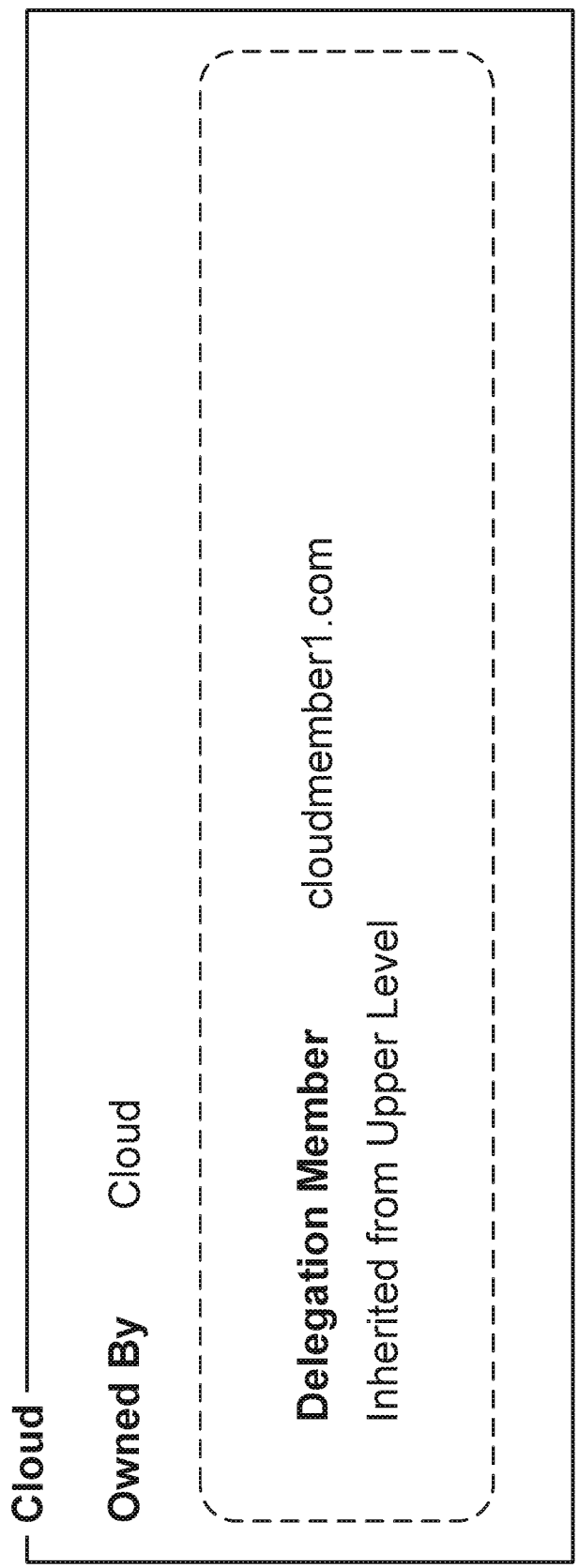
FIG. 8 is another screen shot of an interface for an editor for a cloud network for cloud network automation in accordance with some embodiments.

FIG. 8 is another screen shot of an interface for an editor for a cloud network for cloud network automation in accordance with some embodiments. In one embodiment, a grid manager (e.g., grid manager 218 as shown in FIG. 2) generates the interface shown in FIG. 8 (e.g., using a cloud automation interface 314 as similarly shown in FIG. 3). In this example, the editor follows a similar pattern to the wizard cloud section described above with respect to FIG. 7, except in this example the owned by field indicates that the object is owned by the cloud (e.g., a cloud object refers to an object created by the cloud adapter). As such, FIG. 8 illustrates a cloud section in a network owned by the cloud adapter, in which the delegation authority to cloudmember1.com is inherited from a parent (e.g., inherited from upper level) as shown in FIG. 8.

Figure 9:
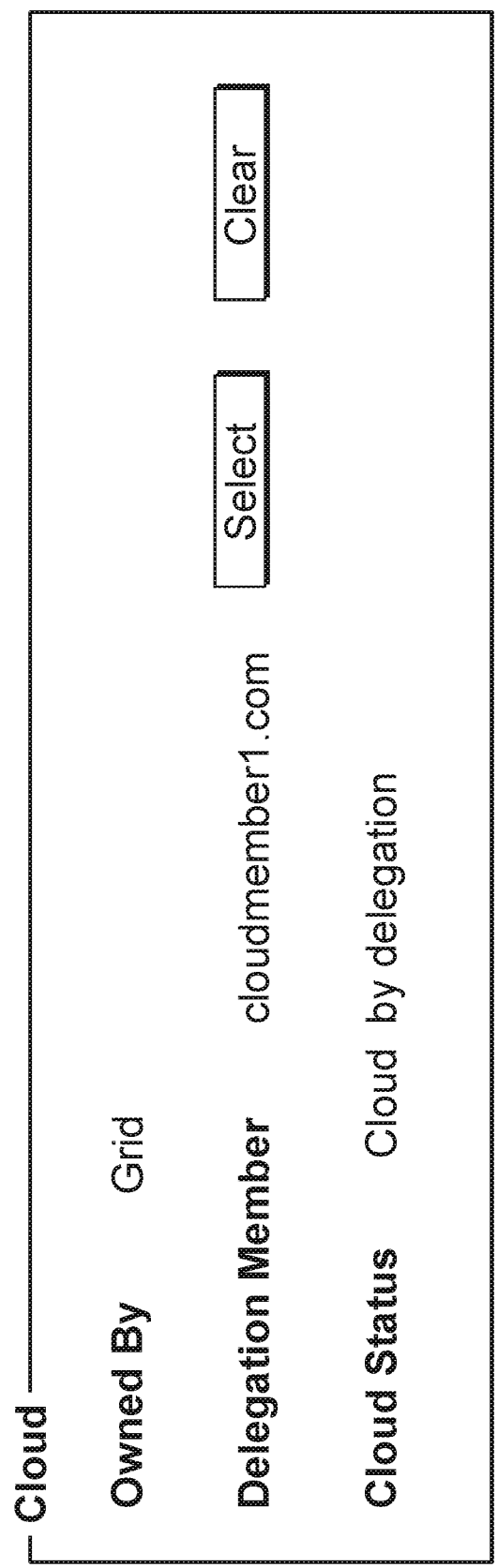
FIG. 9 is another screen shot of an interface for an editor for a cloud network for cloud network automation in accordance with some embodiments.

FIG. 9 is another screen shot of an interface for an editor for a cloud network for cloud network automation in accordance with some embodiments. In one embodiment, a grid manager (e.g., grid manager 218 as shown in FIG. 2) generates the interface shown in FIG. 9 (e.g., using a cloud automation interface 314 as similarly shown in FIG. 3). For example, a delegated object refers to an object assigned to a cloud-API member. In this example, FIG. 9 illustrates a cloud section in a network being delegated to a cloud-API member and shows that it is owned by the grid (e.g., as a delegated object) and that the delegation authority to cloudmember1.com can be configured with a cloud status of cloud by delegation as shown in FIG. 9.

Extensible Attributes for Cloud Objects

In one embodiment, when cloud network automation is first enabled, a set of extensible attributes (e.g., metadata) that are specific for cloud usage is installed on the cloud platform appliance (e.g., installed by NIOS on the appliance). For example, these cloud extensible attributes can be used to tag objects that belong to the CMP. To identify a cloud object, users can reference some of these cloud attributes when creating, modifying, or deleting a specific object.

An example list of cloud extensible attributes that can be installed on the cloud platform appliance include the following: account specifies the CMP user account for creating networks; application type indicates the application type, such as web, database, or CRM; availability zone; cloud API owned to indicate whether an object was created by the cloud adapter (e.g., binary value); CMP type to indicate the type of CMP, such as VMware or OpenStack or another CMP provider; host aggregates; interface name; Is External for object type network and network container (e.g., True, False), Is Shared for object type network and network container (e.g., True, False), IP type to indicate the type of IP address (e.g., fixed, floating); location; network encap; network ID (e.g., network ID in OpenStack); network name; physical network name; port attached device—device ID to indicate device ID for associated device, such as OpenStack or equivalent in other CMP provider environments; port attached device—device owner to indicate a device name for associated device, such as OpenStack or equivalent in other CMP provider environments (e.g., compute:nova, network:dhcp, or network:router_interface); port group (e.g., VMware or equivalent in other hypervisor or CMP provider environments); port ID for associated device, such as OpenStack or equivalent in other CMP provider environments; port name for associated device, such as OpenStack or equivalent in other CMP provider environments; segmentation ID, subnet ID, subnet name, tenant ID to indicate a unique ID for the tenant object; vDC, VLAN ID, VM ID for an instance ID, such as OpenStack or equivalent in other CMP provider environments; VM name for an instance name, such as OpenStack or equivalent in other CMP provider environments; vCD App for the application name defined in vCloud Director (vCD); and vCD Org for the organization name defined in vCloud Director. In this example, some of the attributes are read-only and users cannot modify their properties. These attributes are applicable for specific object types or for identification purposes.

For example, users can modify some of the properties for the cloud specific extensible attributes (e.g., except for the read-only attributes). By default, all cloud specific attributes can be configured to allow read/write access for the cloud platform appliances. Users can change the configuration to read only such that the cloud platform appliances can only access the attribute values, but not modify them.

Viewing Cloud Objects

In one embodiment, cloud network automation for IP address management facilitates viewing cloud objects. For example, various cloud objects can be viewed using a grid manager (e.g., that is integrated with or in communication with a CMP for a cloud environment), including new cloud objects such as networks, VMs, and tenants.

In an example implementation, users can view cloud objects and their related information in a cloud tab of the grid manager (e.g., grid manager 218 as shown in FIG. 2, which can be generated using a cloud automation interface 314 as similarly shown in FIG. 3). The cloud tab can provide the following sub tabs for viewing different information related to cloud objects: tenants, networks, VMs, and members. In addition to viewing data in these tabs, users can utilize this example interface to perform one or more of the following: click an action icon and select an action from a menu; modify some of the data in a table; edit the properties of an object; export the list of objects (e.g., to a .csv file); print a list of objects; and filter/search for objects In one embodiment, an interface generated by the grid manager (e.g., grid manager 218 as shown in FIG. 2) includes a cloud tab (e.g., cloud viewer) that displays all objects (e.g., tenants, networks, virtual machines (VMs)) that come from the cloud management platform (CMP). For example, the cloud tab can include viewers for displaying tenants, networks, and virtual machines. A tenants view will now be described.

Viewing All Tenants

Figure 10:
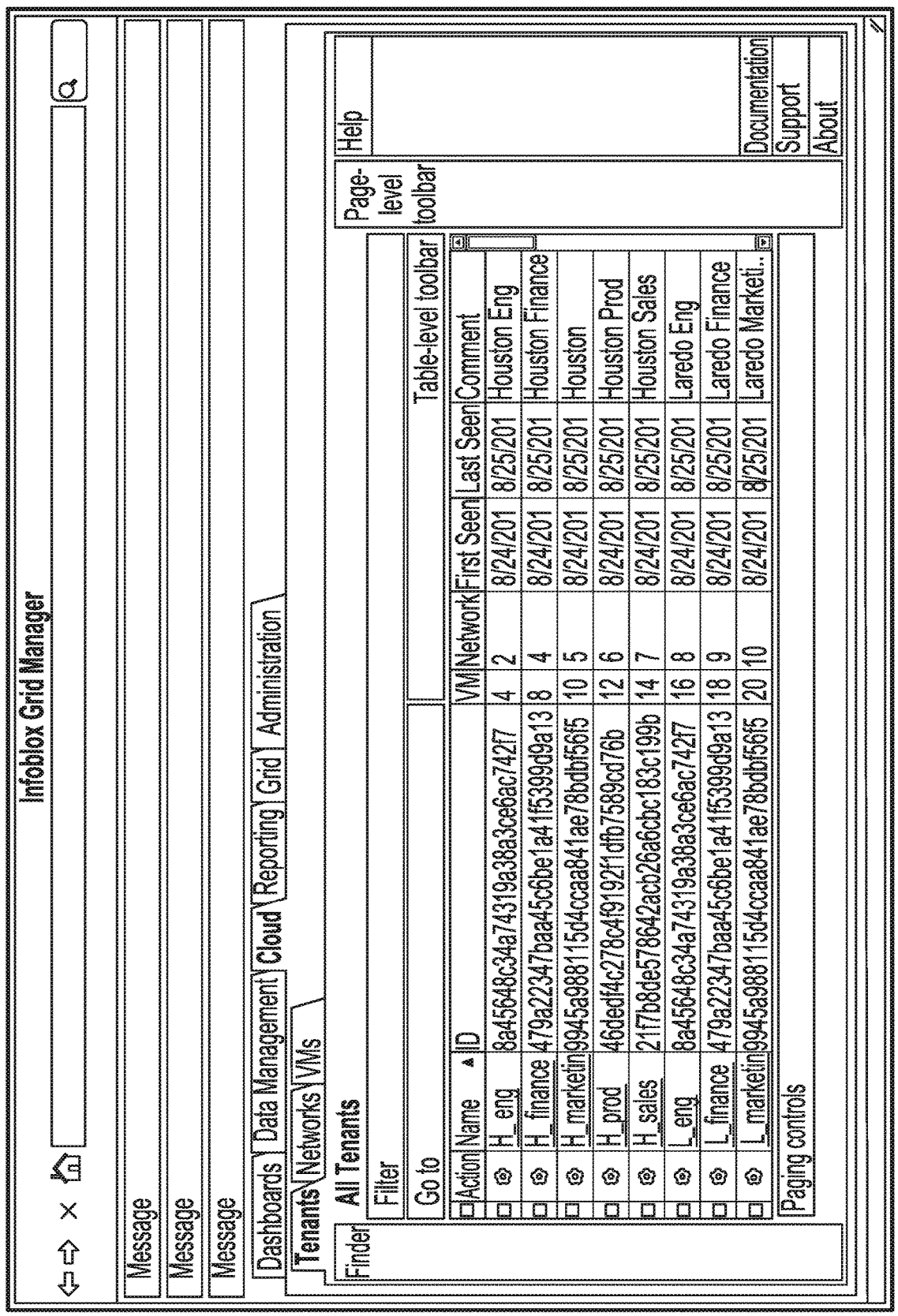
FIG. 10 is a screen shot of an interface for viewing tenants in a cloud for cloud network automation in accordance with some embodiments.

FIG. 10 is a screen shot of an interface for viewing tenants in a cloud for cloud network automation in accordance with some embodiments. In one embodiment, a grid manager (e.g., grid manager 218 as shown in FIG. 2) generates the interface shown in FIG. 10 (e.g., using a cloud automation interface 314 as similarly shown in FIG. 3). In this example, the Tenants tab (e.g., tenant viewer) displays/lists all tenants from the CMP. As used herein, tenant is an abstract administrative concept, such as similarly described above. Similar to a tenant in the CMP, a tenant object in this example implementation encompasses all network elements, such as networks, zones, VMs, IP addresses (e.g., fixed and floating), network views, default DNS views, and all related extensible attributes associated with that tenant. Multiple tenants can be mapped to the same network view. A tenant can also have VMs (e.g., with IP addresses) in its shared or external networks that are in different network views.

In an example implementation, in the grid manager, users can click a tenant name in the cloud tab and drill down into the tenants child view and view the networks and VMs sub tabs to view networks and VMs associated with the selected tenant. In the VMs sub tab of the tenants tab, the user can click a VM name and drill down more to view the networks and IP addresses sub tabs for the selected VM.

FIG. 11 is a screen shot of an interface for editing a tenant in a cloud for cloud network automation in accordance with some embodiments. In one embodiment, a grid manager (e.g., grid manager 218 as shown in FIG. 2) generates the interface shown in FIG. 11 (e.g., using a cloud automation interface 314 as similarly shown in FIG. 3). In this example, a tenant editor is displayed in FIG. 11 that includes a general, extensible attributes, and permissions tab as shown. As also shown in FIG. 11, the general table includes an editable name field, a read only ID field for the unique tenant ID, and an editable comment field. For example, the tenant ID can be provided through cloud API requests.

In an example implementation, a total number of IPv4 and IPv6 networks and network containers associated with this tenant can also be displayed (e.g., this number includes only networks and network containers created by the cloud adapter).

In an example implementation, a total number of VM objects associated with this tenant can also be displayed (e.g., this can include the following object types: Host Record, Fixed Address, and any resource record type such as A, AAAA, PTR, and CNAME records).

In an example implementation, tenants can only be created and deleted through cloud API requests. However, users can modify the name, extensible attributes, and permissions for a specified tenant through the tenant editor in the grid manager if the users have valid tenant permissions (e.g., all tenants or per tenant object), as also shown through the General, Extensible Attributes, and Permissions left-sided tabs in FIG. 11 as similarly described above.

In an example implementation, a timestamp is associated with a tenant and indicates when the tenant was first created (e.g., a field that cannot be edited by a user). In this example, this timestamp can indicate the time when the tenant object was first seen by the grid master, so it may not match the timestamp when the original cloud API request was sent.

Figure 12:
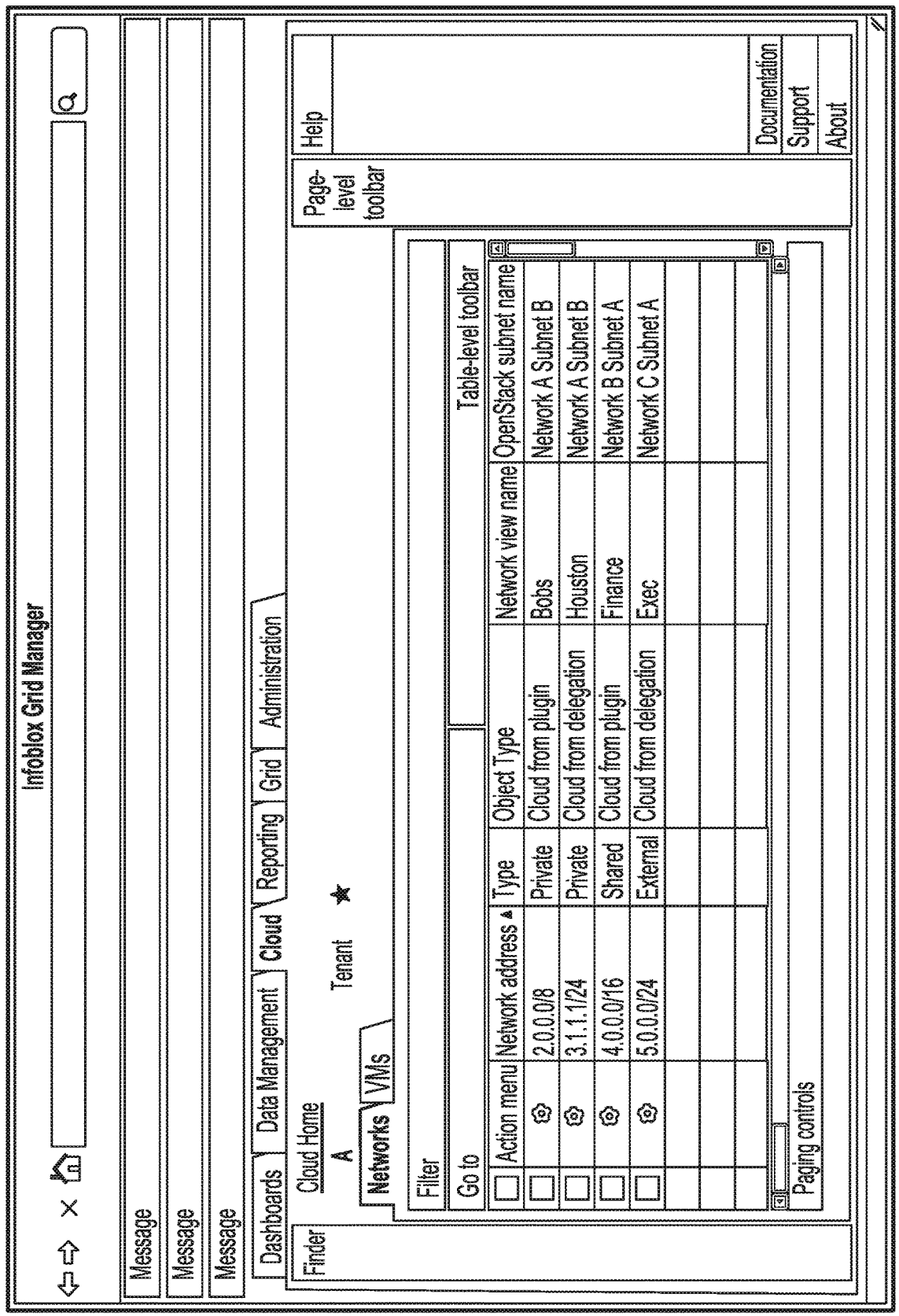
FIG. 12 is a screen shot of an interface for viewing cloud networks for a selected tenant in a cloud for cloud network automation in accordance with some embodiments.

FIG. 12 is a screen shot of an interface for viewing cloud networks for a selected tenant in a cloud for cloud network automation in accordance with some embodiments. In one embodiment, a grid manager (e.g., grid manager 218 as shown in FIG. 2) generates the interface shown in FIG. 12 (e.g., using a cloud automation interface 314 as similarly shown in FIG. 3). For example, the cloud networks associated with a selected tenant are displayed including an action menu, a network address, a type, an object type, a network view name, and a subnet name as shown in FIG. 12. In an example implementation, a total number of IPv4 and IPv6 networks and network containers associated with this tenant can also be displayed (e.g., this number includes only networks and network containers created by the cloud adapter). In an example implementation, selecting a network for editing launches a network editor and selecting a network container for editing launches a network editor container.

Figure 13:
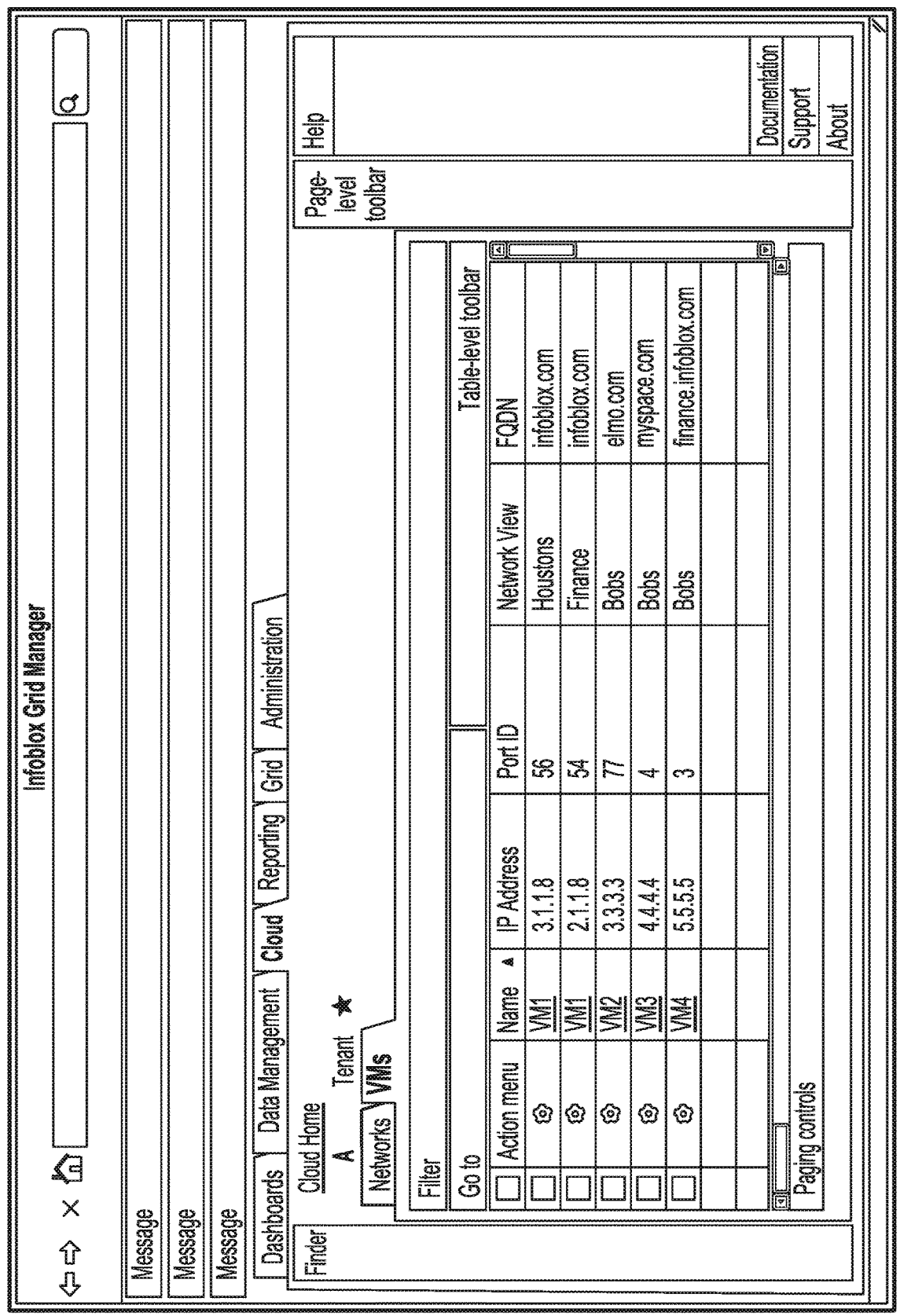
FIG. 13 is a screen shot of an interface for viewing virtual machines (VMs) for a selected tenant in a cloud for cloud network automation in accordance with some embodiments.

FIG. 13 is a screen shot of an interface for viewing virtual machines (VMs) for a selected tenant in a cloud for cloud network automation in accordance with some embodiments. In one embodiment, a grid manager (e.g., grid manager 218 as shown in FIG. 2) generates the interface shown in FIG. 13 (e.g., using a cloud automation interface 314 as similarly shown in FIG. 3). For example, the VMs associated with a selected tenant are displayed including an action menu, a name, an IP address, a port ID, a network view name, and a fully qualified domain name (FQDN) as shown in FIG. 13. In an example implementation, a total number of VM objects associated with this tenant can also be displayed (e.g., this can include the following object types: Host Record, Fixed Address, and any resource record type such as A, AAAA, PTR, and CNAME records).

In an example implementation, if a user drills into a VM object (e.g., selects a VM object), then a VM details is displayed that includes viewers for networks (e.g., a network viewer that can display all networks associated with the selected VM such as shown below in FIG. 14) and IP addresses (e.g., an IP addresses viewer that can display all networks associated with the selected VM such as shown below in FIG. 15).

Figure 14:
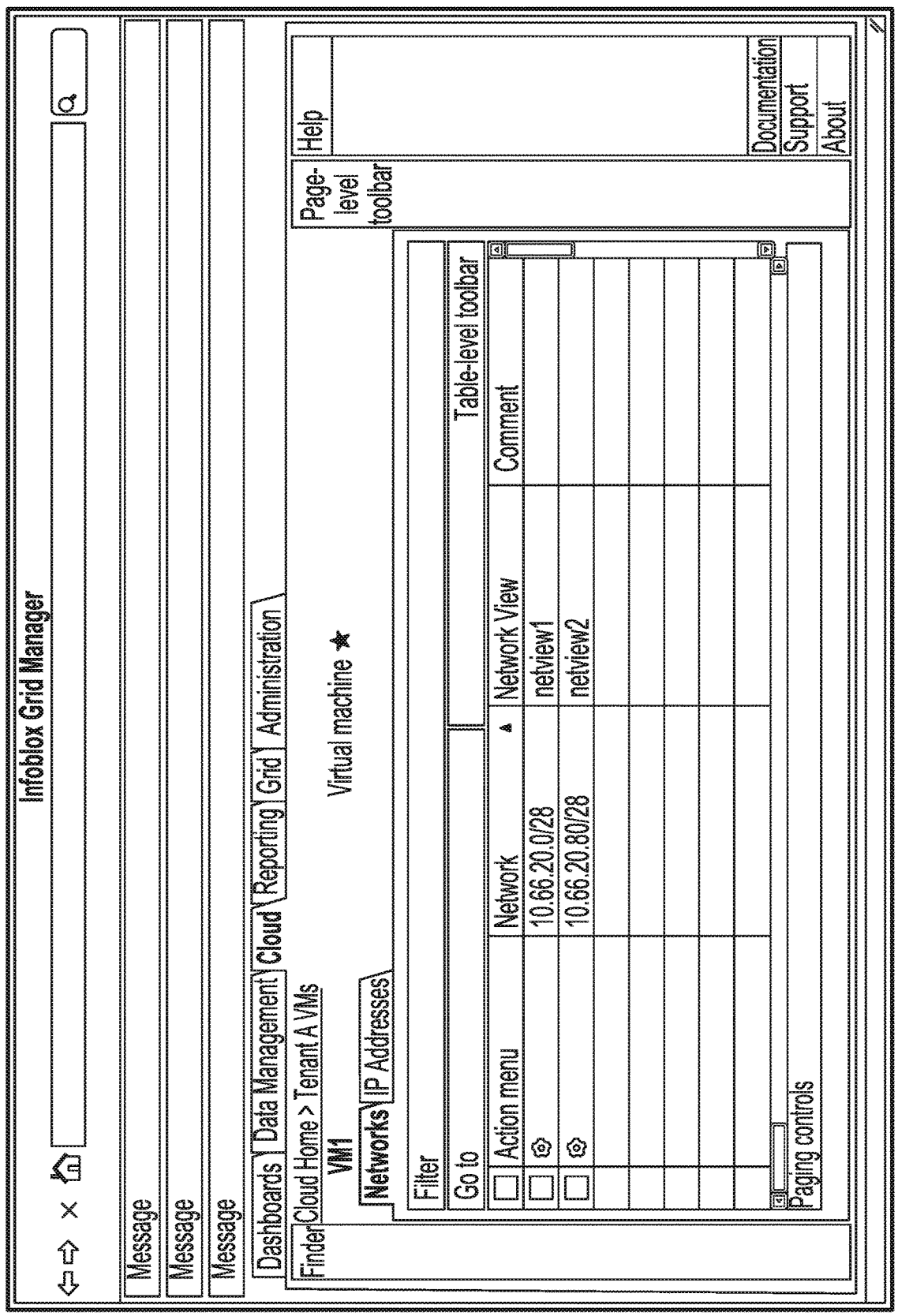
FIG. 14 is a screen shot of an interface of a network viewer for viewing networks associated with a selected virtual machine (VM) for a selected tenant in a cloud for cloud network automation in accordance with some embodiments.

FIG. 14 is a screen shot of an interface of a network viewer for viewing networks associated with a selected virtual machine (VM) for a selected tenant in a cloud for cloud network automation in accordance with some embodiments. In one embodiment, a grid manager (e.g., grid manager 218 as shown in FIG. 2) generates the interface shown in FIG. 14 (e.g., using a cloud automation interface 314 as similarly shown in FIG. 3). For example, in the network viewer, all networks associated with the selected VM associated with a selected tenant are displayed including an action menu, a network, a network view, and a comment field as shown in FIG. 14.

Figure 15:
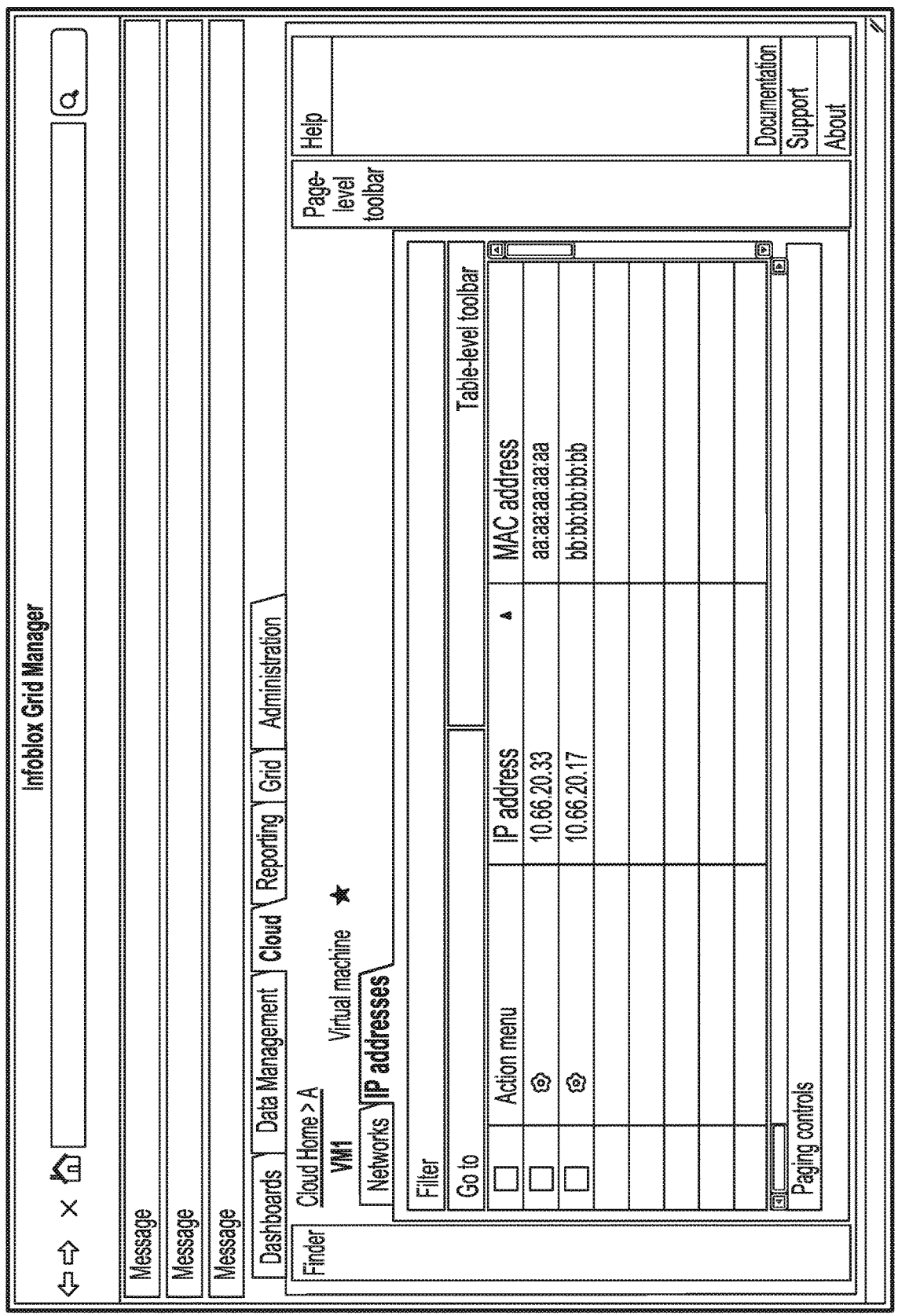
FIG. 15 is a screen shot of an interface of an IP addresses viewer for viewing a selected virtual machine (VM) for a selected tenant in a cloud for cloud network automation in accordance with some embodiments.

FIG. 15 is a screen shot of an interface of an IP addresses viewer for viewing a selected virtual machine (VM) for a selected tenant in a cloud for cloud network automation in accordance with some embodiments. In one embodiment, a grid manager (e.g., grid manager 218 as shown in FIG. 2) generates the interface shown in FIG. 15 (e.g., using a cloud automation interface 314 as similarly shown in FIG. 3). For example, in the IP addresses viewer, all IP addresses associated with the selected VM associated with a selected tenant are displayed including an action menu, an IP address, and a MAC address as shown in FIG. 15.

Viewing All Cloud Networks

Figure 16:
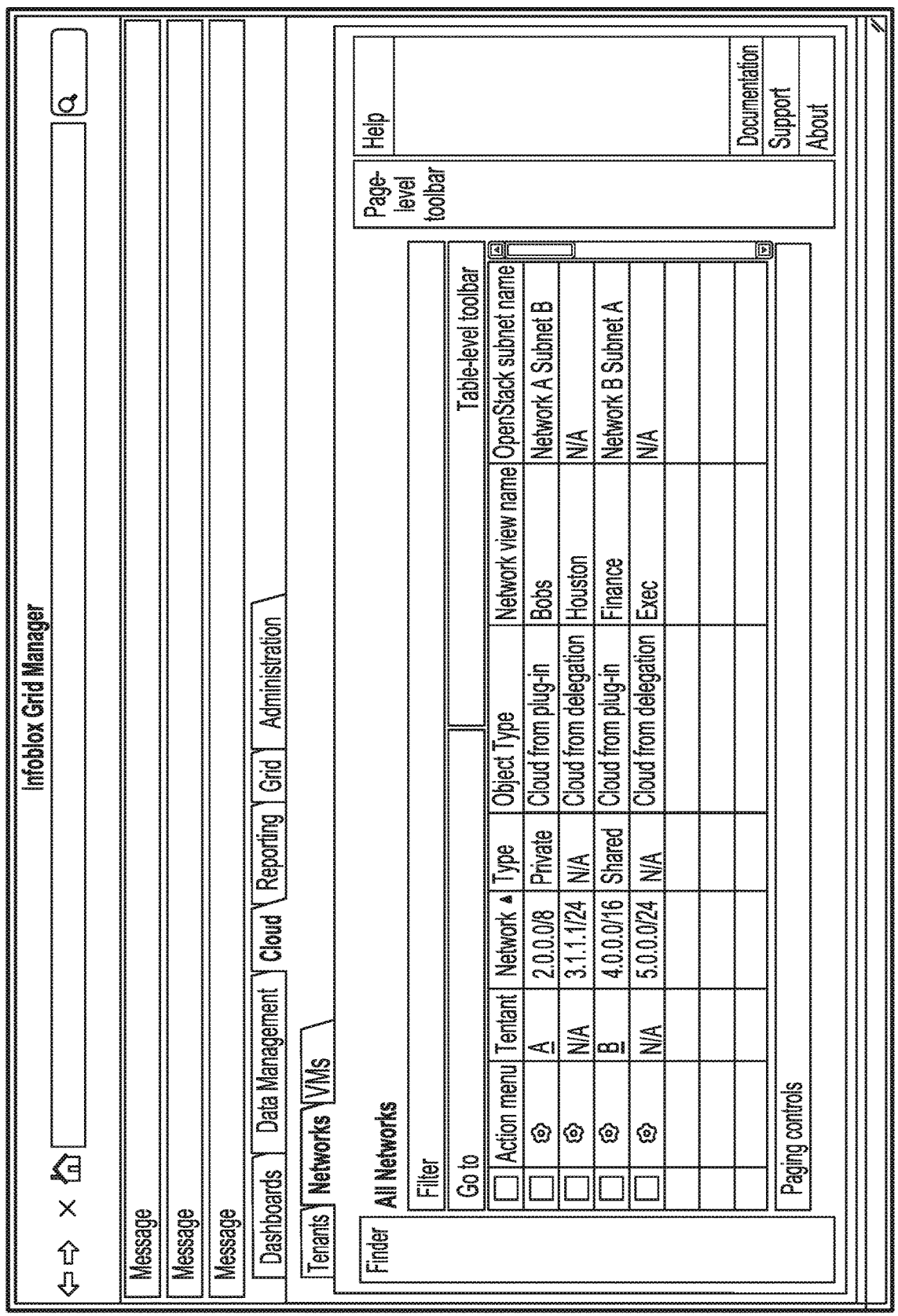
FIG. 16 is a screen shot of an interface for viewing all cloud networks for cloud network automation in accordance with some embodiments.

FIG. 16 is a screen shot of an interface for viewing all cloud networks for cloud network automation in accordance with some embodiments. In one embodiment, a grid manager (e.g., grid manager 218 as shown in FIG. 2) generates the interface shown in FIG. 16 (e.g., using a cloud automation interface 314 as similarly shown in FIG. 3). For example, an all cloud networks viewer is illustrated in FIG. 16, in which all cloud networks from the CMP (e.g., all IPv4 and IPv6 networks and network containers from the CMP) and all delegated networks are displayed including an action menu, a tenant name (e.g., the tenant to which the network or network container belongs), a network address, a type, an object type, a network view name, and a subnet name as shown in FIG. 16. In an example implementation, the tenant name column link drills down into the above-described tenant's network viewer. In an example implementation, selecting a network for editing launches a network editor and selecting a network container for editing launches a network editor container (e.g., which allows a user to modify its properties using the appropriate network/network container editor).

In an example implementation, an object type field is a cloud usage field that indicates whether this object is associated with any specific cloud extensible attributes or within a scope of delegation. In this example, the cloud usage field can be one of the following: cloud from adapter, cloud from delegation, used by cloud, non-cloud, and owned by. Cloud from adapter indicates that this object has been created by a cloud adapter and it may or may not be within a scope of delegation at the moment. Cloud from delegation indicates that this object is within the scope of delegation or the object itself defines a scope of authority delegation, and it is not created by a cloud adapter. Used by cloud indicates that this network or network container is associated with the extensible attribute 'is external or is shared' and the value is set to true, which implies the network is a private or shared network managed by the CMP, and it is not cloud from adapter or cloud from delegation. Non-cloud indicates that the object is a regular object (e.g., NIOS object) and is not within the scope of any authority delegation nor is it associated with any of these extensible attributes: cloud API owned, is external or is shared (e.g., NIOS admin users can modify this object based on their permissions).

As similarly described above, a cloud object can be owned by the grid master or the cloud adapter. When the object is created by the grid master, this can be indicated as grid. If the object is created by the cloud adapter, this can be indicated by adapter or cloud adapter.

As similarly described above, a cloud object can be delegated to a cloud platform appliance or it may not be delegated to a cloud platform appliance. If the cloud object has a parent object and the parent has been delegated, this field shows the parent delegation and, in this example, users cannot modify the field (e.g., unless an override of the parent delegation for this parent object is permitted).

Viewing All Cloud VMs

Figure 17:
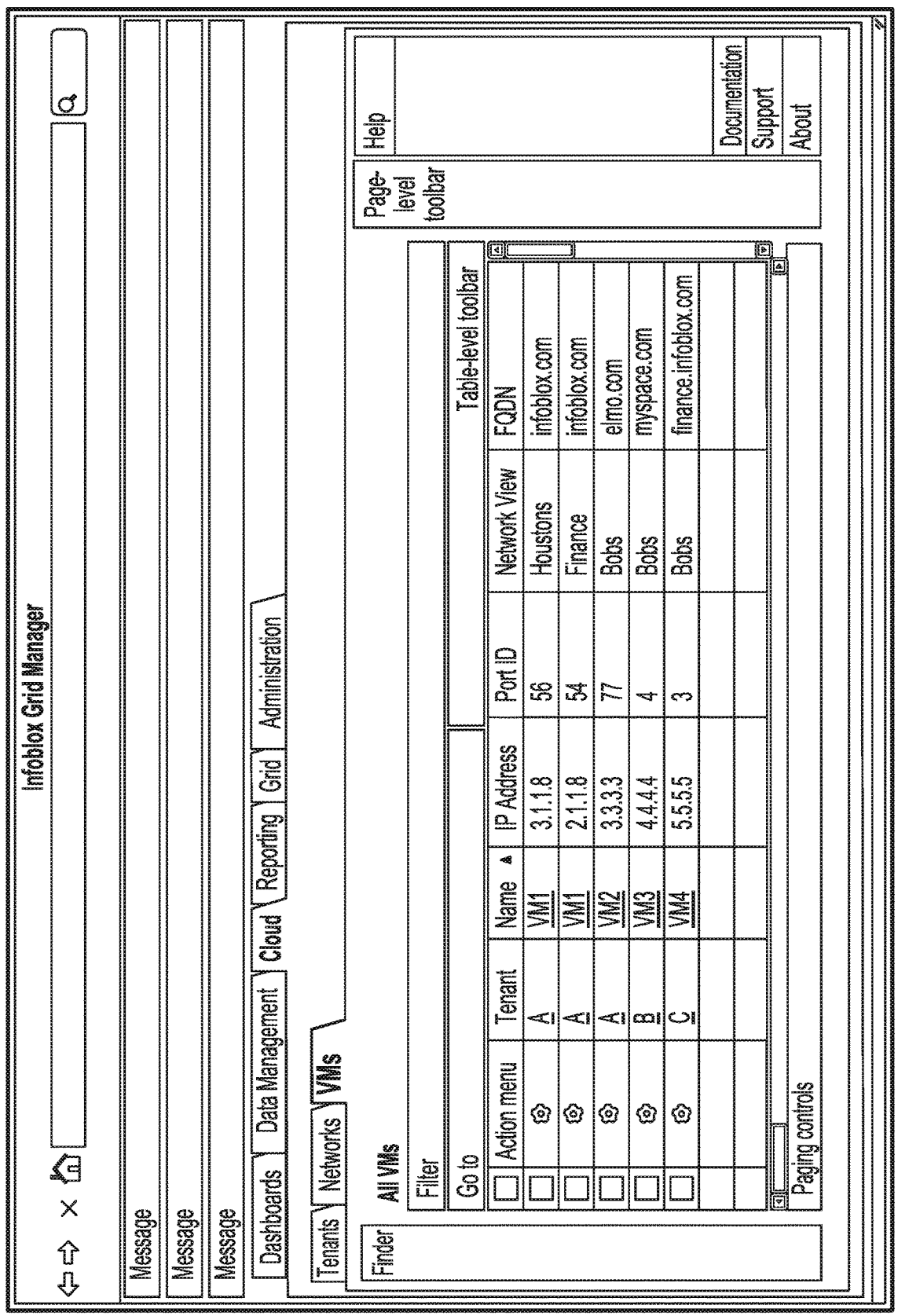
FIG. 17 is a screen shot of an interface for viewing all virtual machines (VMs) for all tenants for cloud network automation in accordance with some embodiments.

FIG. 17 is a screen shot of an interface for viewing all virtual machines (VMs) for all tenants for cloud network automation in accordance with some embodiments. In one embodiment, a grid manager (e.g., grid manager 218 as shown in FIG. 2) generates the interface shown in FIG. 17 (e.g., using a cloud automation interface 314 as similarly shown in FIG. 3). For example, an all VMs viewer is illustrated in FIG. 17, in which all VMs that are associated with all tenants are displayed including an action menu, a tenant name/ID (e.g., a unique tenant ID to which this VM belongs), a name, an IP address (e.g., IP address of the VM), a port ID (e.g., port ID for the VM), a network view name (e.g., network view to which this VM belongs), and an FQDN (e.g., FQDN of the VM) as shown in FIG. 17. In an example implementation, the tenant name column link drills down into the above-described tenant's VM viewer, and the name column link drills down into the tenant's VM details viewer, as similarly described above. For example, users can click a tenant name and drill down to the networks and IP addresses sub tabs to view networks and IP addresses associated with the selected VM.

In this example, a VM object refers to an abstract object representing a virtual machine (VM) that is running on the CMP. A VM belongs to one and only one tenant. Each VM may have an IP address that is part of an overlapping private IP address space and one or more IP addresses in the shared or external networks. In an example implementation, a VM object in NIOS can be a collection of supported object types that have the same value for the extensible attribute VM ID. In this example, only the following NIOS object types are considered as existing VMs when they are tagged with the VM ID attribute: host record, A record, AAAA record, PTR record, and fixed address. A VM object may be defined by objects from different network views. As such, a VM can be defined by objects from different network views, the same IP address may appear multiple times if it has been defined in more than one network view. In this example, a VM object is a read-only abstract object, and as a result, users cannot create, modify, or delete it.

Viewing All Cloud Members

Figure 18:
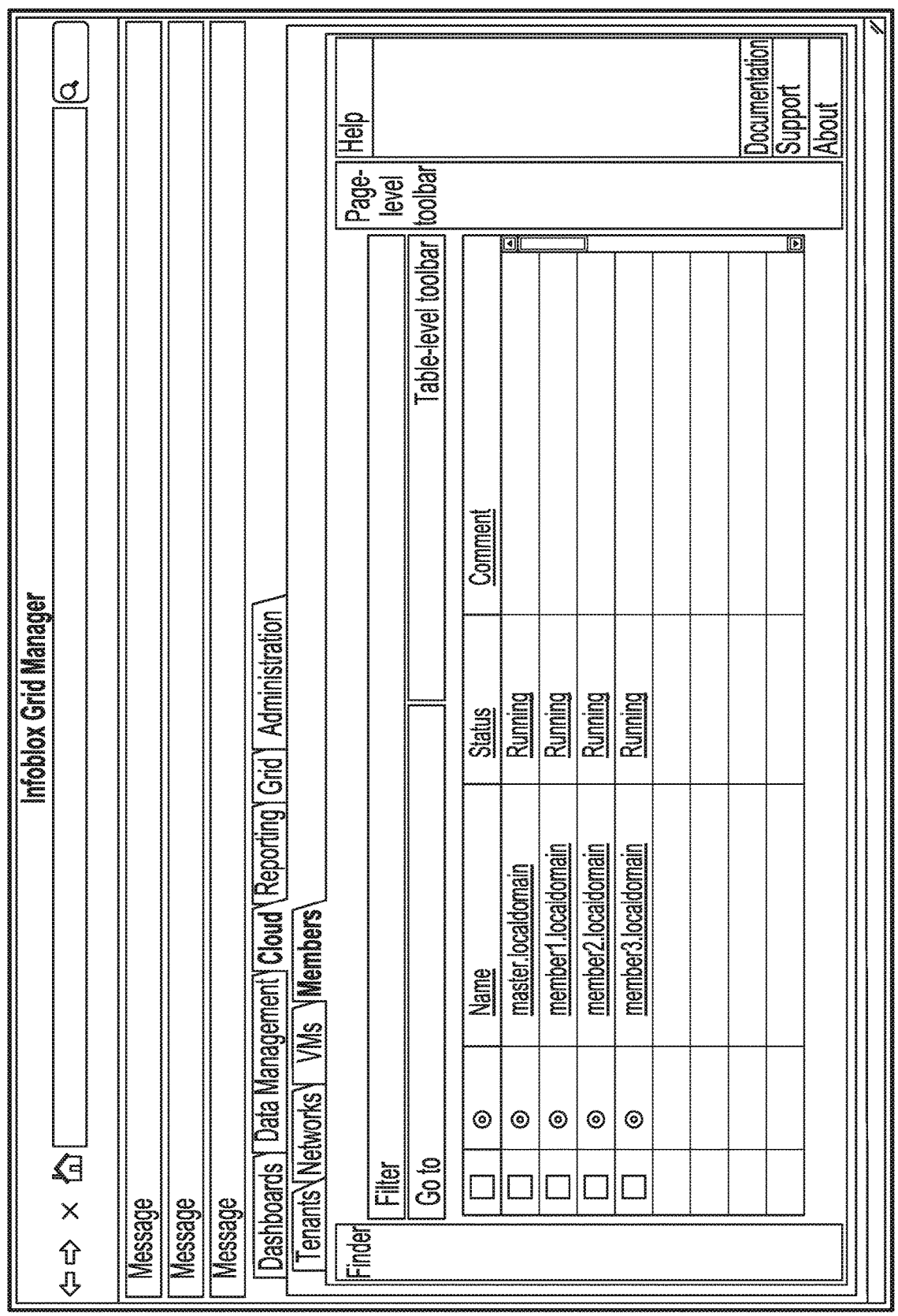
FIG. 18 is a screen shot of an interface for viewing a status of grid members for cloud network automation in accordance with some embodiments.

FIG. 18 is a screen shot of an interface for viewing a status of grid members for cloud network automation in accordance with some embodiments. In one embodiment, a grid manager (e.g., grid manager 218 as shown in FIG. 2) generates the interface shown in FIG. 18 (e.g., using a cloud automation interface 314 as similarly shown in FIG. 3). For example, the member tab displays all grid members (e.g., cloud platform appliances that are members of the grid) that are currently executing the cloud API service as shown in FIG. 18, in which the following information is displayed for each of such members: a name (e.g., a member name), a status (e.g., a current status of this member, such as whether it is currently running/executing), and a comment field (e.g., information about this member) as shown in FIG. 18.

Dashboards and Statistics for Cloud Network Automation for IP Address Management In one embodiment, the disclosed techniques for cloud network automation for IP address management include providing dashboards that can include various cloud related statistics. In an example implementation, the cloud related statistics can be generated using a cloud statistics generator component (e.g., cloud statistics generator 320 as shown in FIG. 3, which can be executed on a cloud platform appliance and/or implemented as part of a grid manager application executed on a grid manager).

FIG. 19 is a screen shot of an interface for a network over thresholds configuration panel for cloud network automation in accordance with some embodiments. In one embodiment, a grid manager (e.g., grid manager 218 as shown in FIG. 2) generates the interface shown in FIG. 19 (e.g., using a cloud automation interface 314 as similarly shown in FIG. 3). For example, the network over thresholds configuration panel (e.g., a cloud configuration widget) can also display cloud networks, and the configuration panel shown in FIG. 19 allows users to select all network views or a single network view and to select all tenants or a single tenant. As also shown, the configuration panel also allows users to configure threshold values (e.g., percentages) for IPAM utilization and DHCP utilization. These selections impact the displays for cloud statistics (e.g., impact the counts/statistics in the cloud statistic widgets) that can be automatically generated and displayed by the grid manager, such as further described below with respect to FIGS. 20-22.

FIG. 20 is a screen shot of an interface for cloud statistics for tenant and virtual machines (VMs) for cloud network automation in accordance with some embodiments. In one embodiment, a grid manager (e.g., grid manager 218 as shown in FIG. 2) generates the interface shown in FIG. 20

(e.g., using a cloud automation interface 314 as similarly shown in FIG. 3). For example, the cloud statistics for tenant and virtual machines (VMs) screen (e.g., a cloud statistics widget) shown in FIG. 20 displays counts/statistics for tenants, cloud VMs, and IP addresses (e.g., IP addresses associated with such tenants and cloud VMs, including average per tenant and total numbers).

Figure 21:
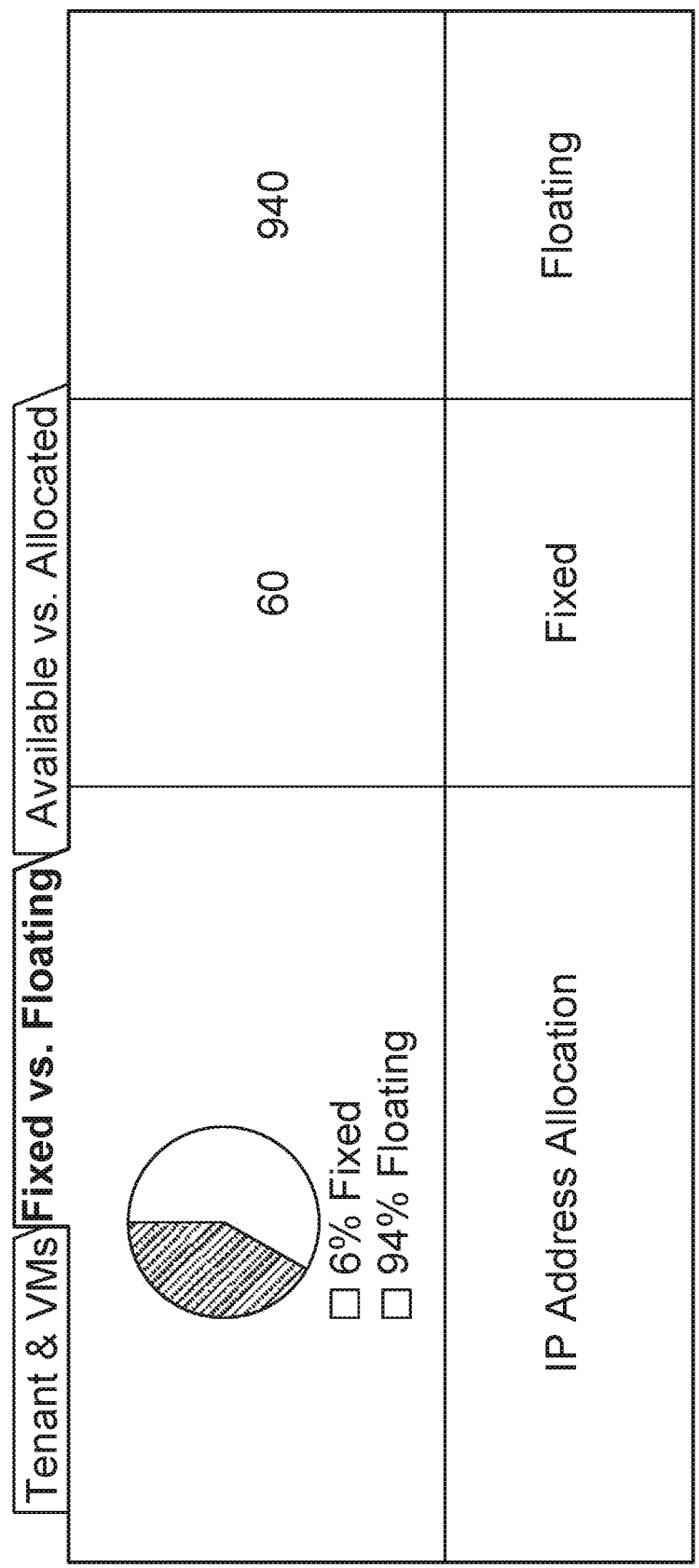
FIG. 21 is a screen shot of an interface for cloud statistics for IP address allocation associated with fixed IP addresses versus floating IP addresses for cloud network automation in accordance with some embodiments.

FIG. 21 is a screen shot of an interface for cloud statistics for IP address allocation associated with fixed IP addresses versus floating IP addresses for cloud network automation in accordance with some embodiments. In one embodiment, a grid manager (e.g., grid manager 218 as shown in FIG. 2) generates the interface shown in FIG. 21 (e.g., using a cloud automation interface 314 as similarly shown in FIG. 3). For example, the cloud statistics for IP address allocation associated with fixed IP addresses versus floating IP addresses screen (e.g., a cloud statistics widget) shown in FIG. 21 displays counts/statistics for IP address allocation associated with fixed IP addresses versus floating IP addresses (e.g., percentages and total numbers of each category).

Figure 22:
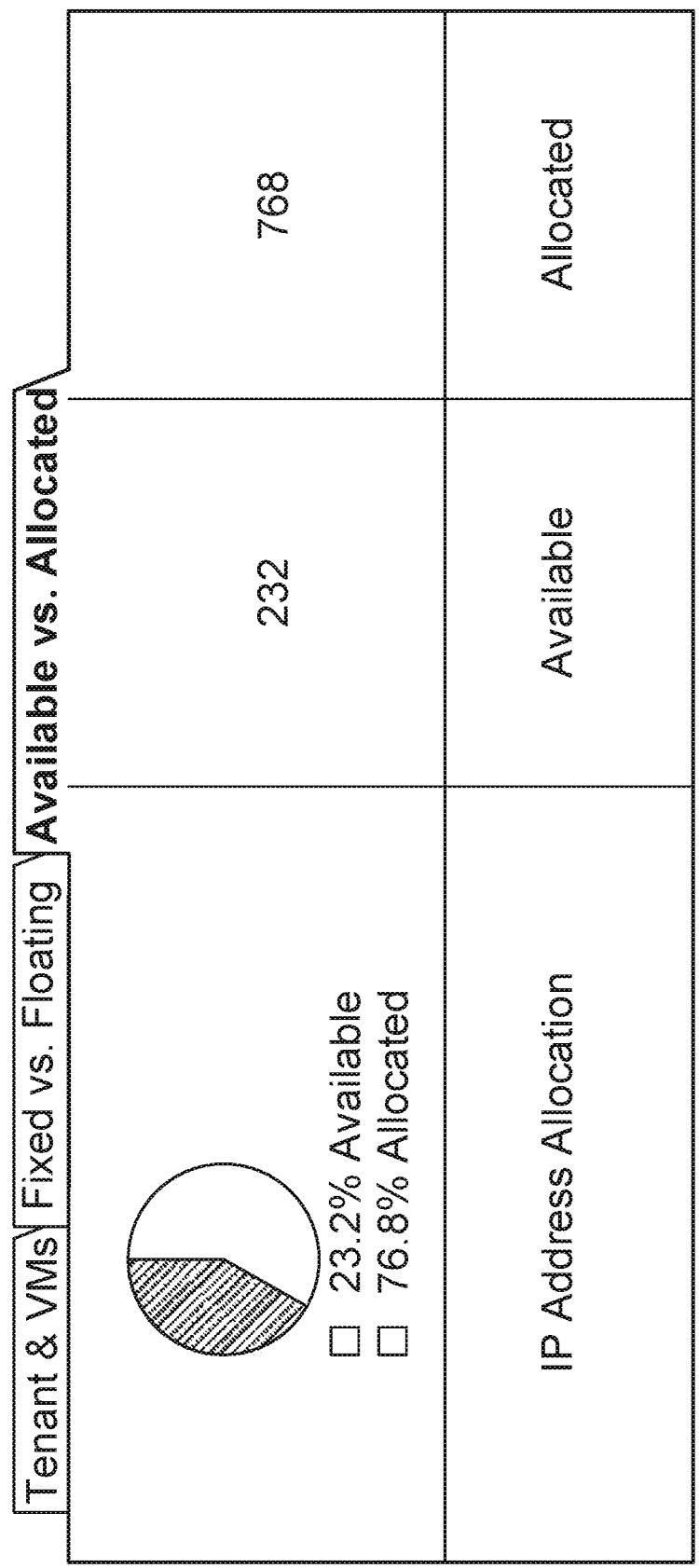
FIG. 22 is a screen shot of an interface for cloud statistics for IP address allocation associated with available IP addresses versus allocated IP addresses for cloud network automation in accordance with some embodiments.

FIG. 22 is a screen shot of an interface for cloud statistics for IP address allocation associated with available IP addresses versus allocated IP addresses for cloud network automation in accordance with some embodiments. In one embodiment, a grid manager (e.g., grid manager 218 as shown in FIG. 2) generates the interface shown in FIG. 22 (e.g., using a cloud automation interface 314 as similarly shown in FIG. 3). For example, the cloud statistics for IP address allocation associated with available IP addresses versus allocated IP addresses screen (e.g., a cloud statistics widget) shown in FIG. 22 displays counts/statistics for IP address allocation associated with available IP addresses versus allocated IP addresses (e.g., percentages and total numbers of each category).

As will now be apparent to one of ordinary skill in the art in view of the disclosed embodiments, various other cloud statistics can similarly be generated and displayed (e.g., by the grid manager or another computing device) using the disclosed techniques.

Example Processes for Cloud Network Automation for IP Address Management

Example processes for performing the disclosed techniques for cloud network automation for IP address management will now be described.

Figure 23:
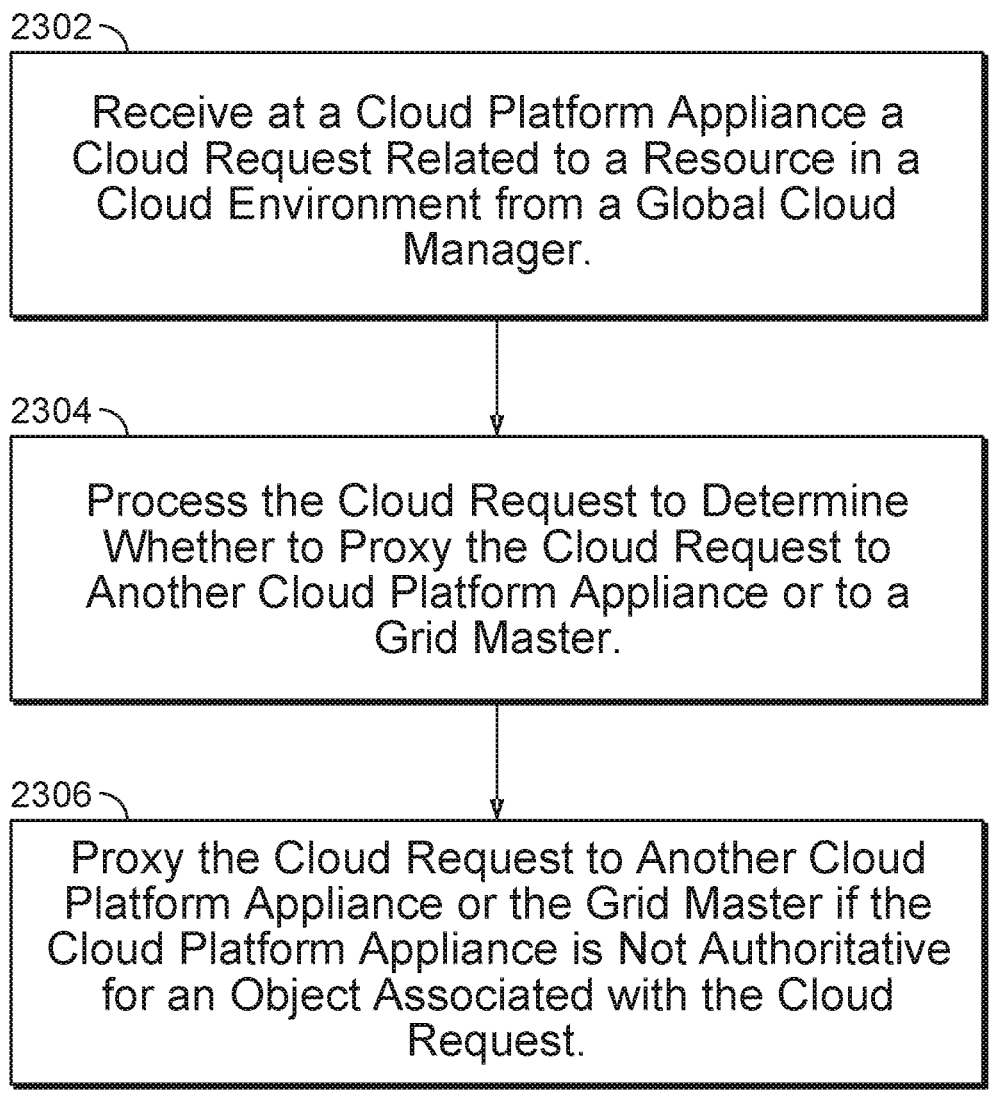
FIG. 23 is a flow diagram illustrating a process for cloud network automation for IP address and DNS record management in accordance with some embodiments.

FIG. 23 is a flow diagram illustrating a process for cloud network automation for IP address and DNS record management in accordance with some embodiments. In one embodiment, the process is performed by a cloud platform appliance, such as the activity and cloud platform appliance described above.

Referring to FIG. 23, at 2302, a cloud request related to a resource in a cloud environment from a global cloud manager is received at a cloud platform appliance. For example, the resource can be a virtual or physical resource. Also, the cloud platform appliance can be a virtual or physical IP address and/or DNS record management appliance that is a member of a grid that includes a plurality of cloud platform appliances and a grid master.

At 2304, processing the cloud request at the cloud platform appliance is performed to determine whether to proxy the cloud request to another cloud platform appliance or to a grid master or to locally process the cloud request. For example, whether to proxy the cloud request can be determined based on which cloud platform appliance (if any) is authoritative for an object associated with the cloud request.

At 2306, proxying the cloud request to another cloud platform appliance or the grid master if the cloud platform appliance (e.g., configured as a primary cloud platform appliance) is not authoritative for an object associated with the cloud request is performed. For example, if none of the cloud platform appliances in the grid are authoritative for the object associated with the cloud request, then the cloud request can be proxied to the grid master. Otherwise, the cloud request is proxied to the cloud platform appliance in the grid that is authoritative for the object associated with the cloud request (e.g., as in this case, the primary cloud platform appliance was determined to not be authoritative for the object associated with the cloud request).

As a result of the processing of the cloud request (e.g., locally or by another cloud platform appliance or the grid master), a storage of infrastructure metadata information for IP address and DNS record management (e.g., for the grid) is updated based on the cloud request (e.g., if processed by one of the cloud platform appliances, then any such updates based on the processed cloud request can also be synchronized to the grid master, and the grid, as similarly described above). For example, the infrastructure metadata information can include one or more of the following: a fully qualified domain name (FQDN), an Internet Protocol (IP) address, a Media Access Control (MAC) address, an operating system (OS) metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, and an external network metadata.

Figure 24:
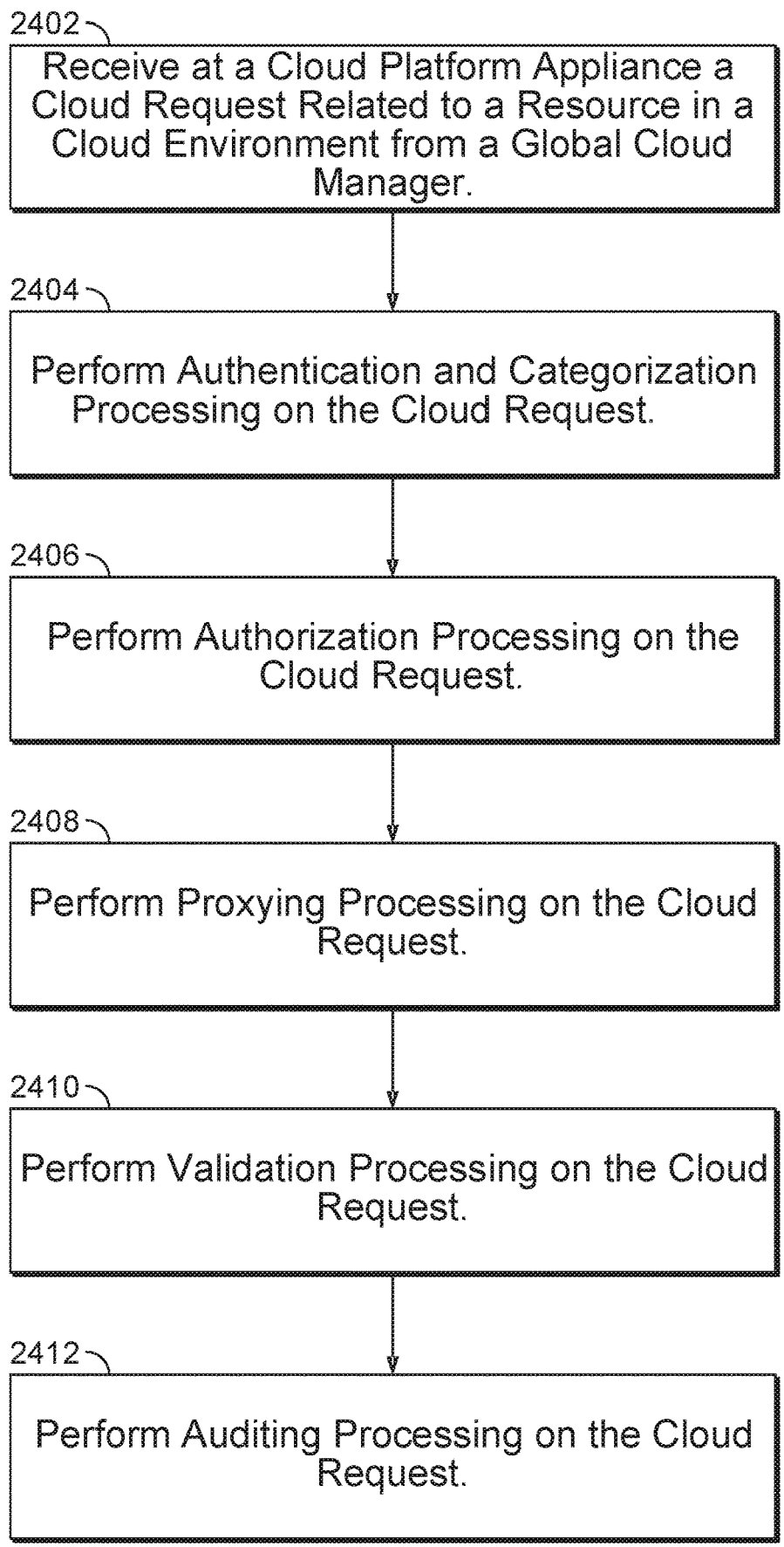
FIG. 24 is another flow diagram illustrating a process for cloud network automation for IP address and DNS record management in accordance with some embodiments.

FIG. 24 is another flow diagram illustrating a process for cloud network automation for IP address and DNS record management in accordance with some embodiments. In one embodiment, the process is performed by a cloud platform appliance, such as the activity and cloud platform appliance described above.

Referring to FIG. 24, at 2402, a cloud request related to a resource in a cloud environment is received from a global cloud manager at a cloud platform appliance. For example, the resource can be a virtual or physical resource. The virtual resource can include one or more of the following: a virtual machine, a virtual entity, a virtual device, a virtual network, a virtual switch, a virtual host adaptor, and a virtual appliance. Also, the cloud platform appliance can be a virtual or physical IP address/DNS management appliance that is a member of a grid that includes a plurality of cloud platform appliances and a grid master.

At 2404, authentication and categorization processing is performed on the cloud request. For example, cloud requests (e.g., cloud API requests) can be authenticated based on the authentication sources. Once authenticated, the requests can be categorized as either a cloud API request or not. Requests that specify user identity as authorized users (e.g., users that belong to the cloud-api-only admin group) can be categorized as cloud API requests, such as similarly described above.

At 2406, authorization processing is performed on the cloud request. For example, cloud API requests can be subject to authorization based on the Access Control Lists (ACLs) defined for the grid or cloud platform appliance (e.g., to control which admin accounts can be used to send cloud API requests). In some cases, the ACLs can include admin users in the cloud-api-only group or remote authenticated users, such as similarly described above.

At 2408, proxying processing is performed on the cloud request. For example, if a cloud platform appliance is not authoritative for a cloud request, it proxies the request either to the authoritative cloud platform appliance or to the grid master for processing. Also, if an object associated with the cloud request has been delegated and the cloud request is made to the grid master, then the grid master proxies that request to the authoritative cloud platform appliance, such as similarly described above.

At 2410, validation processing is performed on the cloud request. For example, as similarly described above, the cloud platform appliance can perform a validation (e.g., a final validation) on the cloud request based on permissions configured for the admin users and restrictions for the applicable objects. If the request is processed within the scope of an explicit delegation, the admin user is considered to have full permissions within the scope, and any permission defined for the cloud-api-only admin group is ignored. Otherwise, the request is subject to validation for all permissions defined for the cloud-api-only admin group.

At 2412, auditing processing is performed on the cloud request. For example, cloud API related events can be logged to the system log (syslog) (e.g., Infoblox NIOS™ syslog) of the grid member that processes the cloud API requests, such as similarly described above.

Figure 25:
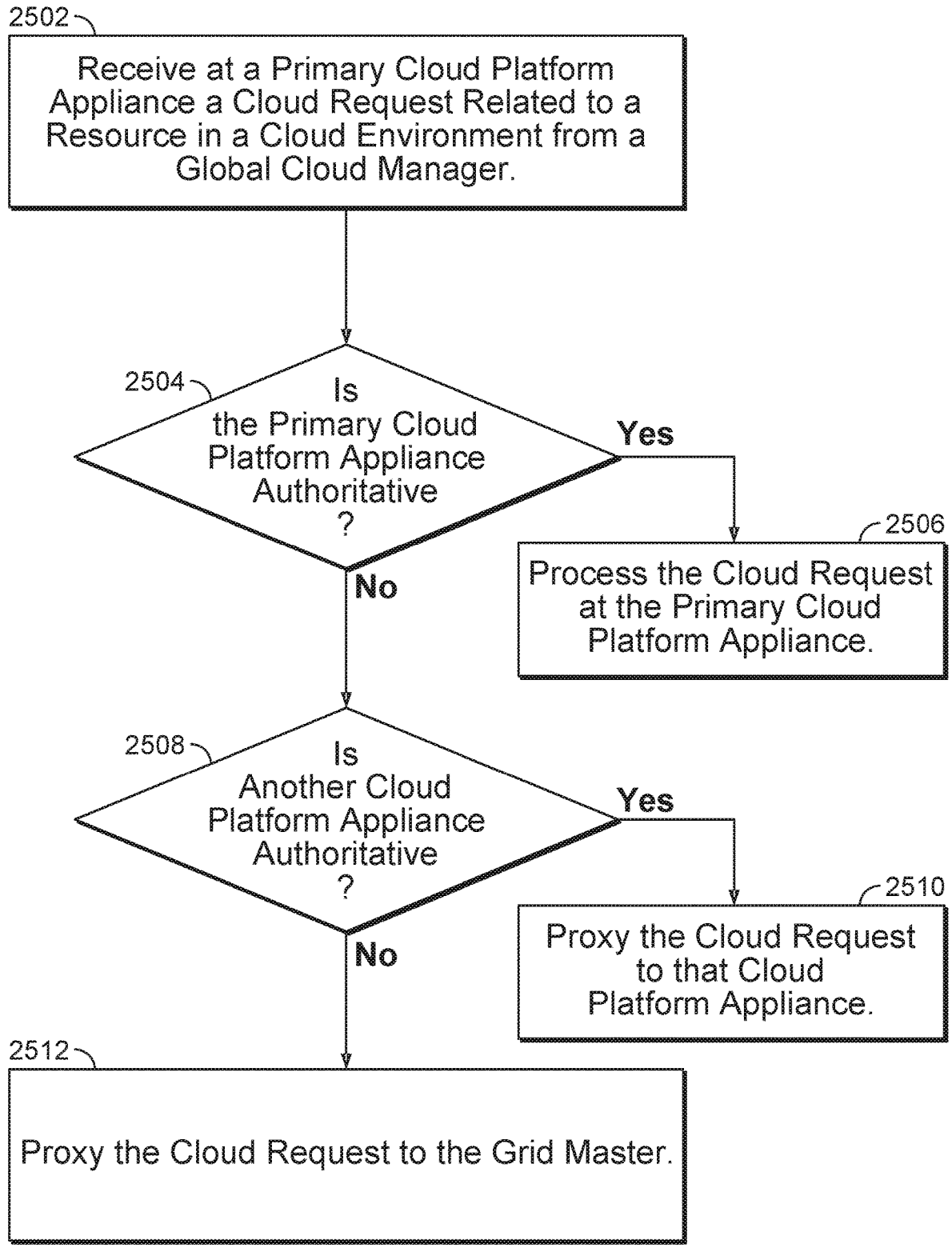
FIG. 25 is another flow diagram illustrating a process for cloud network automation for IP address and DNS record management in accordance with some embodiments.

FIG. 25 is another flow diagram illustrating a process for cloud network automation for IP address and DNS record management in accordance with some embodiments. In one embodiment, the process is performed by a cloud platform appliance, such as the activity and cloud platform appliance described above.

Referring to FIG. 25, at 2502, a cloud request related to a resource in a cloud environment is received from a global cloud manager at a primary cloud platform appliance. For example, the cloud platform appliance can be configured as the primary platform appliance for a grid that includes a plurality of cloud platform appliances and a grid master.

At 2504, processing the cloud request at the cloud platform appliance is performed to determine whether the primary cloud platform appliance is authoritative. For example, whether to proxy the cloud request can be determined based on which cloud platform appliance (if any) is authoritative for an object associated with the cloud request, such as further described below.

At 2506 the cloud request is processed at the primary cloud platform appliance. In this example, the primary cloud platform appliance is authoritative for the cloud request, and the primary cloud platform appliance can locally process (e.g., further process) the cloud request, rather than proxying the cloud request to another member of the grid for further processing.

At 2508, processing the cloud request at the cloud platform appliance is performed to determine whether another cloud platform appliance is authoritative. For example, whether any other cloud platform appliance in the grid (if any) is authoritative for the object associated with the cloud request is determined, such as similarly described above.

At 2510, proxying the cloud request to another cloud platform appliance is performed. In this example, another cloud platform appliance in the grid is authoritative for the cloud request, and the primary cloud platform appliance proxies the cloud request to that cloud platform appliance for further processing, such as similarly described above.

At 2512, proxying the cloud request to the grid master is performed. In this example, none of the cloud platform appliances in the grid is authoritative for the cloud request, and the primary cloud platform appliance proxies the cloud request to the grid master for further processing, such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a first cloud platform appliance configured to:
receive a cloud request related to a resource in a cloud environment from a global cloud manager; and
process the cloud request to determine whether to proxy the cloud request to a second cloud platform appliance or a grid master or to locally process the cloud request at the first cloud platform, wherein a storage of infrastructure metadata information for IP address and/or DNS record management is updated based on the cloud request, and wherein the processing of the cloud request comprises to:
determine that the second cloud platform appliance does not have authorization to process the cloud request based on an access control list, wherein the access control list includes admin users in a cloud-api-only group, remote authenticated users, or both; and
in response to determining that the second cloud platform appliance does not have authorization to process the cloud request based on the access control list, proxy the cloud request to the grid master to process the cloud request, wherein the first cloud platform appliance is a member of a grid, wherein the grid includes a plurality of cloud platform appliances and the grid master, wherein the plurality of cloud platform appliances includes the second cloud platform appliance, and wherein the grid master maintains a centralized data store of IP address management (IPAM) related data of the grid, DNS related data of the grid, Dynamic Host Configuration Protocol (DHCP) related data of the grid, or any combination thereof, wherein the proxying of the cloud request to the grid master comprises to:
process the cloud request using the grid master, and
a memory coupled to the processor and configured to provide the processor with instructions.

2. The system recited in claim 1, wherein the cloud platform appliance includes an IP address.

3. The system recited in claim 1, wherein the cloud platform appliance includes a DNS record management appliance.

4. The system recited in claim 1, wherein the cloud platform appliance includes a virtual IP address management appliance and/or a virtual DNS record management appliance.

5. The system recited in claim 1, wherein the cloud platform appliance is configured as a primary cloud platform appliance for receiving cloud requests from the global cloud manager.

6. The system recited in claim 1, wherein the resource in the cloud environment is associated with a virtual resource.

7. The system recited in claim 1, wherein the resource in the cloud environment is associated with a physical resource.

8. The system recited in claim 1, wherein the cloud request is an application programming interface (API) request.

9. The system recited in claim 1, wherein the cloud request is an application programming interface (API) request that indicates whether the resource is a newly added resource in the cloud environment, a deleted resource in the cloud environment, or a modified resource in the cloud environment.

10. The system recited in claim 1, wherein the cloud request is sent from a cloud adapter integrated with the global cloud manager.

11. The system recited in claim 1, wherein the processor is further configured to:
  process the cloud request using a cloud application programming interface (API) service executed on the first cloud platform appliance.

12. The system recited in claim 1, wherein the cloud request is sent from a cloud adapter integrated with the global cloud manager, and wherein the processor is further configured to:
  process the cloud request using a cloud application programming interface (API) service executed on the first cloud platform appliance, wherein the cloud API service and the cloud adapter communicate using a secure protocol.

13. The system recited in claim 1, wherein the processor is further configured to:
  authenticate the cloud request.

14. The system recited in claim 1, wherein the processor is further configured to:
  authorize the cloud request.

15. The system recited in claim 1, wherein the processor is further configured to:
  validate the cloud request.

16. The system recited in claim 1, wherein the processor is further configured to:
  proxy the cloud request to a third cloud platform appliance that is authoritative for an object associated with the cloud request.

17. The system recited in claim 1, wherein the first cloud platform appliance is configured as a primary cloud platform appliance for receiving cloud requests from the global cloud manager, and wherein the processor is further configured to:
  proxy the cloud request to a third cloud platform appliance, wherein the third cloud platform appliance is authoritative for an object associated with the cloud request, and wherein the object is associated with an IP address space or DNS record space managed by the third cloud platform appliance.

18. A method of cloud network automation for IP address and DNS record management, comprising:
  receiving, at a first cloud platform appliance, a cloud request related to a resource in a cloud environment from a global cloud manager; and
  processing the cloud request to determine whether to proxy the cloud request to a second cloud platform appliance or a grid master or to locally process the cloud request at the first cloud platform, wherein a storage of infrastructure metadata information for IP address and/or DNS record management is updated based on the cloud request, and wherein the processing of the cloud request comprises:
    determining that the second cloud platform appliance does not have authorization to process the cloud request based on an access control list, wherein the access control list includes admin users in a cloud-api-only group, remote authenticated users, or both; and
    in response to determining that the second cloud platform appliance does not have authorization to process the cloud request based on the access control list, proxying the cloud request to the grid master to process the cloud request, wherein the first cloud platform appliance is a member of a grid, wherein the grid includes a plurality of cloud platform appliances and the grid master, wherein the plurality of cloud platform appliances includes the second cloud platform appliance, and wherein the grid master maintains a centralized data store of IP address management (IPAM) related data of the grid, DNS related data of the grid, Dynamic Host Configuration Protocol (DHCP) related data of the grid, or any combination thereof, wherein the proxying of the cloud request to the grid master comprises:
      processing the cloud request using the grid master.

19. A computer program product, the computer program product being embodied in a tangible non-transitory computer readable storage medium and comprising computer instructions for:
  receiving, at a first cloud platform appliance, a cloud request related to a resource in a cloud environment from a global cloud manager; and
  processing the cloud request to determine whether to proxy the cloud request to a second cloud platform appliance or a grid master or to locally process the cloud request at the first cloud platform, wherein a storage of infrastructure metadata information for IP address and/or DNS record management is updated based on the cloud request, and wherein the processing of the cloud request comprises:
    determining that the second cloud platform appliance does not have authorization to process the cloud request based on an access control list, wherein the access control list includes admin users in a cloud-api-only group, remote authenticated users, or both; and
    in response to determining that the second cloud platform appliance does not have authorization to process the cloud request based on the access control list, proxying the cloud request to the grid master to process the cloud request, wherein the first cloud platform appliance is a member of a grid, wherein the grid includes a plurality of cloud platform appliances and the grid master, wherein the plurality of cloud platform appliances includes the second cloud platform appliance, and wherein the grid master maintains a data store of IP address management (IPAM) related data of the grid, DNS related data of the grid, Dynamic Host Configuration Protocol (DHCP) related data of the grid, or any combination thereof, wherein the proxying of the cloud request to the grid master comprises:
      processing the cloud request using the grid master.

* * * * *